(12) United States Patent
Okubo

(10) Patent No.: US 12,358,424 B2
(45) Date of Patent: Jul. 15, 2025

(54) VEHICLE LAMP

(71) Applicant: Ichikoh Industries, Ltd., Isehara (JP)

(72) Inventor: Yasuhiro Okubo, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 57 days.

(21) Appl. No.: 18/554,547

(22) PCT Filed: Apr. 6, 2022

(86) PCT No.: PCT/JP2022/017165
§ 371 (c)(1),
(2) Date: Oct. 9, 2023

(87) PCT Pub. No.: WO2022/215706
PCT Pub. Date: Oct. 13, 2022

(65) Prior Publication Data
US 2024/0198896 A1    Jun. 20, 2024

(30) Foreign Application Priority Data
Apr. 9, 2021  (JP) .................. 2021-066747

(51) Int. Cl.
*B60Q 1/38* (2006.01)
*B60Q 1/22* (2006.01)
(Continued)

(52) U.S. Cl.
CPC .............. *B60Q 1/381* (2022.05); *B60Q 1/22* (2013.01); *F21S 43/14* (2018.01); *F21S 43/26* (2018.01);
(Continued)

(58) Field of Classification Search
CPC ...... B60Q 1/381; B60Q 1/22; B60Q 2900/40; B60Q 2400/50; F21S 43/14; F21S 43/26;
(Continued)

(56) References Cited

U.S. PATENT DOCUMENTS 10,928,029 B1   2/2021  Woo et al.
2016/0312970 A1* 10/2016  Suwa .................... F21S 41/285
(Continued)

FOREIGN PATENT DOCUMENTS

JP   2019084915 A   6/2019
JP   2019-192350 A  10/2019
(Continued)

OTHER PUBLICATIONS

International Search Report Issued May 17, 2022, in PCT/JP2022/017165, filed on Apr. 6, 2022, 2 pages.
Extended European Search Report issued Mar. 19, 2025, in Patent Application No. 22784688.8, 12 pages.

*Primary Examiner* — Kerri L McNally
(74) *Attorney, Agent, or Firm* — Oblon, McClelland, Maier & Neustadt, L.L.P.

(57) ABSTRACT

An automotive lighting fixtures that can create the desired illumination pattern of light distribution while suppressing enlargement is provided. The vehicular lamp 10 comprises a plurality of light sources (21, 22, 23), a condenser lens 12 that collects light by allowing light from the multiple light sources (21, 22, 23) to enter through an incident surface 34 and exit through an exit surface 35, a light-shielding member 13 provided with a plurality of light-transmitting portions (28) that partially transmit the light collected by the condenser lens 12, and a projection lens 14 that forms an illumination pattern Pi with a plurality of illumination patterns Di corresponding to the plurality of light-transmitting portions by projecting the light transmitted through the light-shielding member 13. The light sources (21, 22, 23) are individually provided corresponding to the light-transmitting portions, and the condenser lens 12 is characterized by having a plurality of condenser lens portions (31, 32, 33) that individually correspond to the light-transmitting portions and are stacked on top of each other.

8 Claims, 8 Drawing Sheets

(51) Int. Cl.
*F21S 43/14* (2018.01)
*F21S 43/20* (2018.01)
*F21V 5/04* (2006.01)
*F21W 103/20* (2018.01)
*F21W 103/60* (2018.01)
*F21Y 115/10* (2016.01)

(52) U.S. Cl.
CPC ............ *F21V 5/04* (2013.01); *B60Q 2400/50* (2013.01); *B60Q 2900/40* (2022.05); *F21W 2103/20* (2018.01); *F21W 2103/60* (2018.01); *F21Y 2115/10* (2016.08)

(58) Field of Classification Search
CPC ... F21V 5/04; F21Y 2115/10; F21W 2103/60; F21W 2103/20; F21W 2900/40
USPC ......................................................... 340/468
See application file for complete search history.

(56) References Cited

U.S. PATENT DOCUMENTS

| | | | |
|---|---|---|---|
| 2017/0261173 A1* | 9/2017 | Suzuki | F21S 41/285 |
| 2019/0009706 A1* | 1/2019 | Gocke | F21S 41/155 |
| 2019/0011102 A1* | 1/2019 | Gehb | F21S 41/43 |
| 2019/0113197 A1* | 4/2019 | Kamiya | F21S 43/14 |
| 2019/0189695 A1* | 6/2019 | Niiyama | F21S 9/02 |
| 2020/0072432 A1* | 3/2020 | Spencer | B60Q 1/143 |
| 2020/0363032 A1* | 11/2020 | Murakami | F21V 5/008 |

FOREIGN PATENT DOCUMENTS

| | | |
|---|---|---|
| JP | 2020102332 A | 7/2020 |
| WO | 2020067305 A1 | 4/2020 |

* cited by examiner

VEHICLE LAMP

TECHNICAL FIELD

The present disclosure relates to a vehicular lamp.

BACKGROUND ART

A vehicular lamp is considered to form an illumination pattern having a plurality of illumination patterns on a road surface around a vehicle (see, for example, Patent Document 1). In this conventional vehicular lamp, an illumination pattern is formed by projecting light from a light source through a slit of a shade (light shielding member), so that a viewer can be notified of some intention. In this conventional vehicular lamp, light from a light source is guided to a shade by a light guide so that the light from the light source is efficiently utilized.

CITATION LIST

Patent Literature

Patent Literature 1: JP 2019-192350 A

SUMMARY OF THE INVENTION

Problems to be Solved by the Invention

However, in the conventional vehicular lamp, since the light from the light source is diffused in the light guide to make the light distribution on the shade uniform, it is difficult to adjust the light distribution on the shade, and it is difficult to make each illumination pattern to be formed into a desired light distribution. In addition, since the conventional vehicular lamp is provided with one projection lens (image projection lens), one shade, and one or more light sources for one illumination pattern, the overall configuration becomes large.

The present disclosure has been made in view of the above circumstances, and it is an object of the present disclosure to provide a vehicular lamp capable of forming an illumination pattern having a desired light distribution while suppressing an increase in size.

Means for Solving the Problem

Disclosed is a vehicular lamp equipped with a plurality of light sources, a condenser lens for condensing light from the plurality of light sources by entering the light from the incident surface and exiting the light from the exit surface, a light-shielding member provided with a plurality of light-transmitting parts for partially transmitting the light condensed by the condenser lens, and a projection lens for forming an illumination pattern having a plurality of illumination patterns corresponding to the plurality of light-transmitting parts by projecting the light passed through the light-shielding member, characterized in that the light sources are provided individually corresponding to the light-transmitting parts and that the condenser lens is provided with a plurality of condenser lens parts which are individually corresponding to the light transmitting portion and stacked on top of each other.

Effect of the Invention

According to the vehicular lamp of the present disclosure, an illumination pattern having a desired light distribution can be formed while suppressing an increase in size.

MODE FOR CARRYING OUT THE INVENTION

Figure 1:
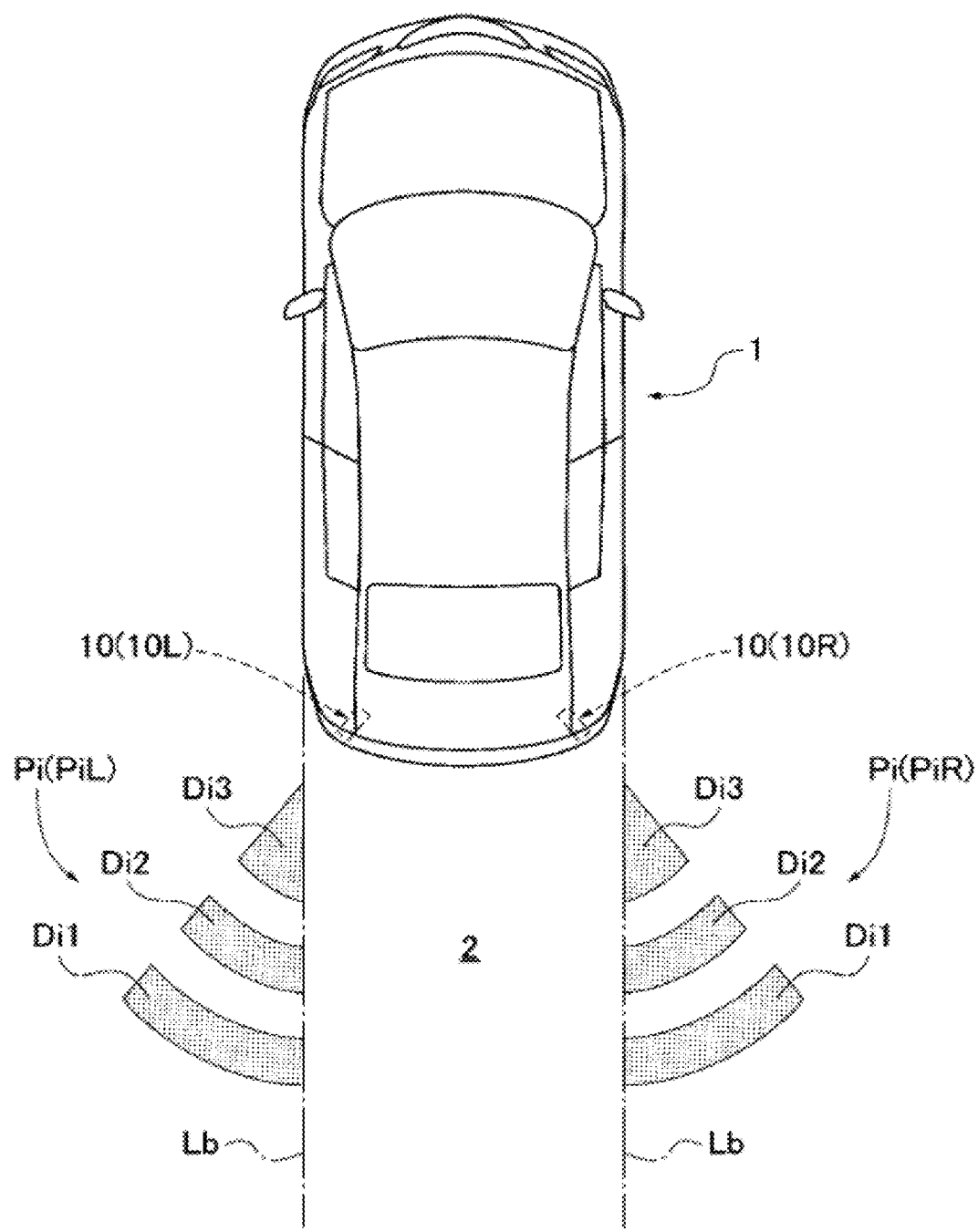
FIG. 1 is an explanatory diagram showing a vehicle lighting fixture according to Embodiment 1 of the present disclosure, installed on a vehicle and forming respective illumination patterns.
Figure 7:
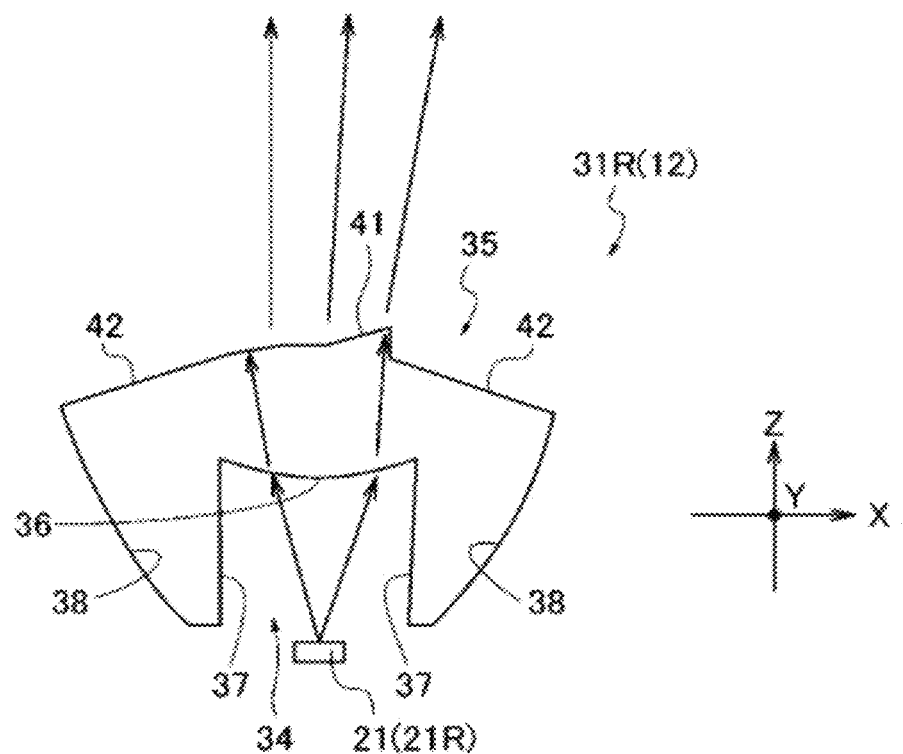
FIG. 7 is an explanatory diagram showing the behavior of light from the first light source, entering from the on-axis incident surface section and exiting from the inner exit surface section, in the first condenser lens portion of the vehicle lighting fixture provided on the right side of the vehicle, as observed in the cross-sectional view.
Figure 8:
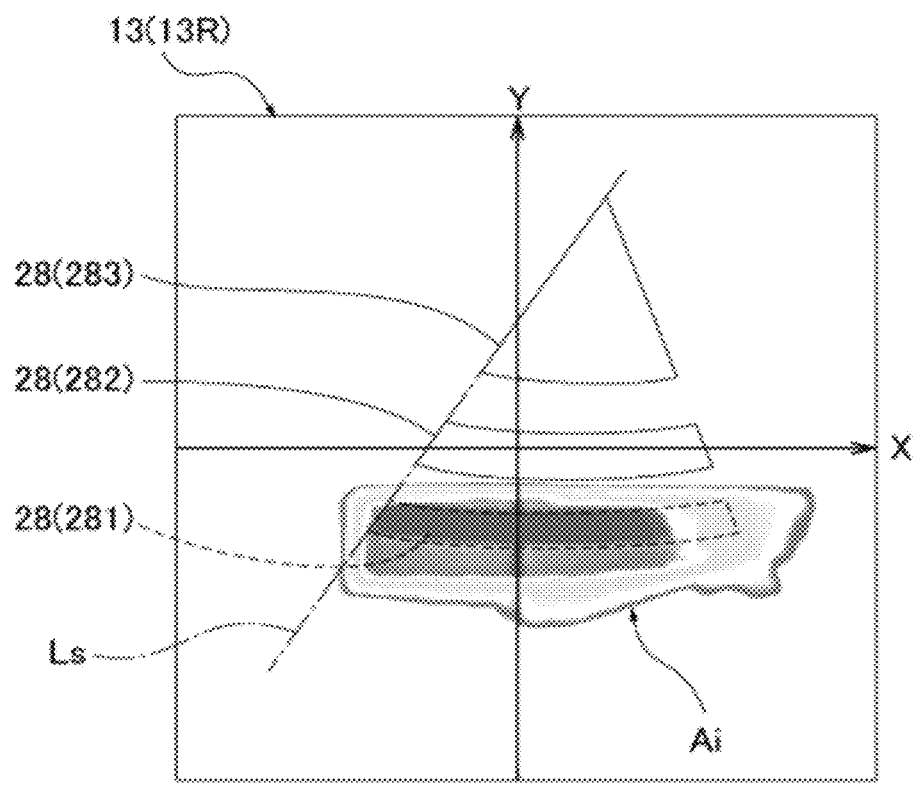
FIG. 8 is an explanatory diagram showing the light distribution (inner region) formed by the light shown in FIG. 7 on the shade.
Figure 9:
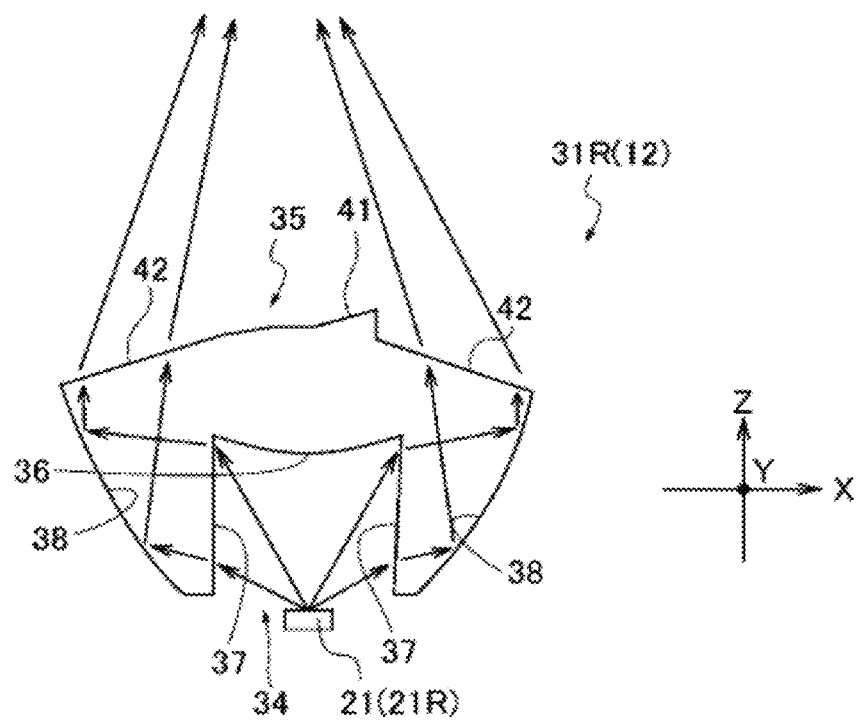
FIG. 9 is an explanatory diagram showing a state in which light from a first light source which enters from an inclined incident surface section on a cross section, is reflected by a reflection surface, and then is emitted from an exit surface section progresses in a first condenser lens portion of a vehicle lamp provided on the right side of a vehicle.
Figure 14:
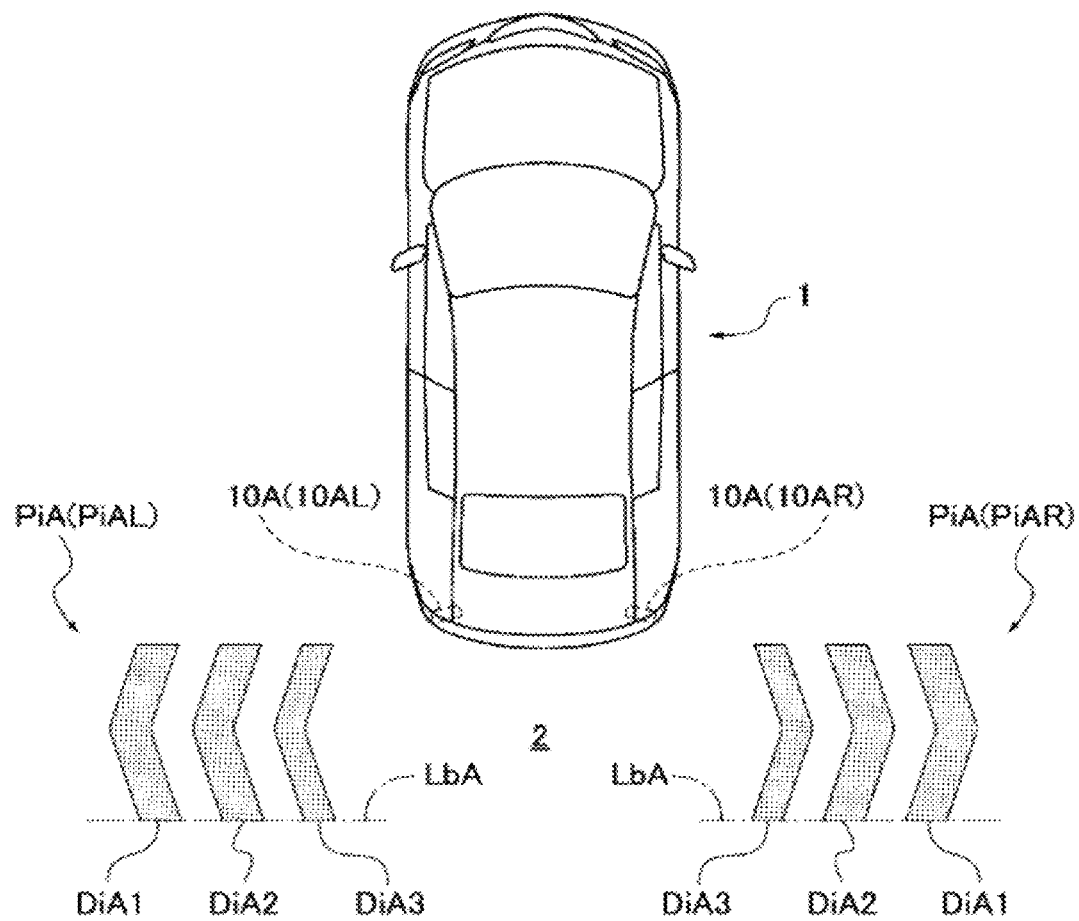
FIG. 14 is an explanatory diagram showing a vehicle lighting fixture according to Example 2 of the present disclosure, installed on a vehicle and forming respective illumination patterns.

Hereinafter, each embodiment of a vehicular lamp 10 as an example of a vehicular lamp according to the present disclosure will be described with reference to the drawings. In FIGS. 1 and 14, the vehicular lamps 10 and 10A are emphasized with respect to the vehicle 1 so that how the vehicular lamp 10, 10A is provided is easily understood. The state does not necessarily coincide with the actual state. In addition, in FIG. 3, the substrate 24 is omitted in order to easily grasp the positional relationship of each light source (21, 22, 23). Further, in FIGS. 4, 5, 15, and 16, the light source portions 11 and 11A and the shades 13 and 13A of the vehicular lamp 10 and 10A provided as a pair on the right and left sides are arranged in the right and left direction in accordance with the left and right direction as seen from a person who gets on the vehicle 1. In FIGS. 4, 5, 8, 10, 11, 15, and 16, the substrate 24 and the shade frame portion 26 are omitted in order to easily grasp the positional relation of each light source (21, 22, 23, 21A, 22A, 23A) and each slit portion 28, 28A and the state of formation of the light distribution (each region). In FIGS. 4, 5, 15, and 16, in order to facilitate understanding of the relationship between the position of each light source (21, 22, 23, 21A, 22A, 23A) and the position of each slit portion 28, 28A, FIGS. 4, 5, 15, and 16 show a state viewed from the front side (projection lens 14 side) in the optical axis direction. Further, in FIGS. 8, 10 and 11, in order to facilitate understanding of the state in which the corresponding light source 21 irradiates the slit portion 28, the state seen from the light source side (rear side in the optical axis direction) is shown. In FIGS. 7 and 9, a hatch showing a cross section in the condenser lens 12 (first condenser lens portion 31) is omitted in order to make it easy to grasp how the light progresses. FIGS. 8, 10, 11 FIG. 10, FIG. 11, and FIG. 12, each region (light distribution) is brighter as the color becomes darker.

Embodiment 1

A vehicular lamp 10 according to a first embodiment of a vehicular lamp according to an embodiment of the present disclosure will be described with reference to FIGS. 1 to 13. As shown in FIG. 1, the vehicular lamp 10 of the first embodiment is used as a lamp for a vehicle 1 such as an automobile, forms an illumination (irradiation) pattern Pi on the road surface 2 around the rear of the vehicle 1 separately from the backing light provided in the vehicle 1, and is provided in the rear part of the vehicle 1. The vehicular lamp 10 may also form the illumination pattern Pi on the road surface 2 around the front or side of the vehicle 1, and is not limited to the configuration of the first embodiment.

In the first embodiment, each of the vehicular lamps 10 is disposed at a position higher than the road surface 2 at the rear end of the vehicle 1, and is provided in a state in which the projection optical axis Lp (see FIG. 2, etc.) is inclined with respect to the road surface 2. The two vehicular lamps 10 have basically the same configuration except that the position at which they are mounted and the position at which the illumination pattern Pi is formed are different. Therefore, in the following description, the configuration is simply described as the vehicular lamp 10. In the vehicular lamp 10, when the lamps are provided on the right side and the left side of the vehicle 1 and are individually shown (including the drawings), R is added to the right side and L is added to the left side at the end of the respective reference numerals. In the following description, in each vehicular lamp 10, a direction in which a projected optical axis Lp, which is a direction of light illumination, extends is an optical axis direction (Z in the drawing), a vertical direction in which the optical axis direction is along a horizontal plane is a vertical direction (Y in the drawing), and a direction orthogonal to the optical axis direction and the vertical direction (horizontal direction) is a width direction (X in the drawing) (see FIG. 2 and the like).

Figure 2:
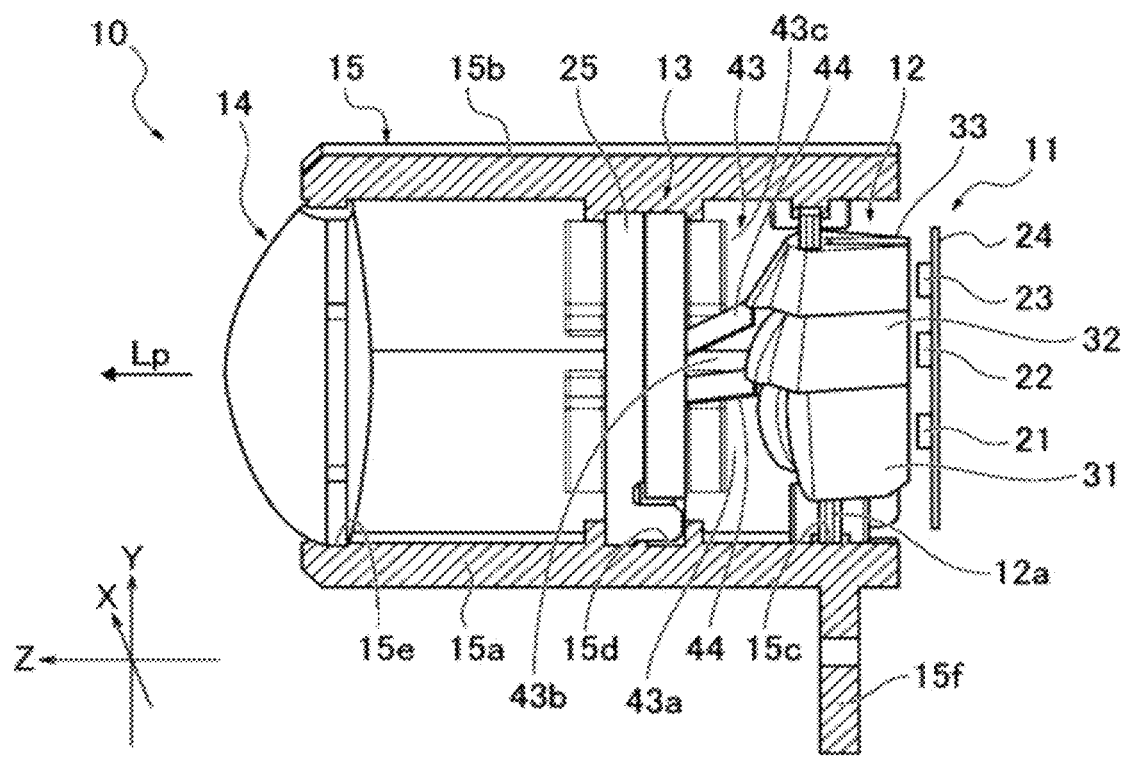
FIG. 2 is an explanatory diagram showing the configuration of the vehicle lighting fixture.
Figure 3:
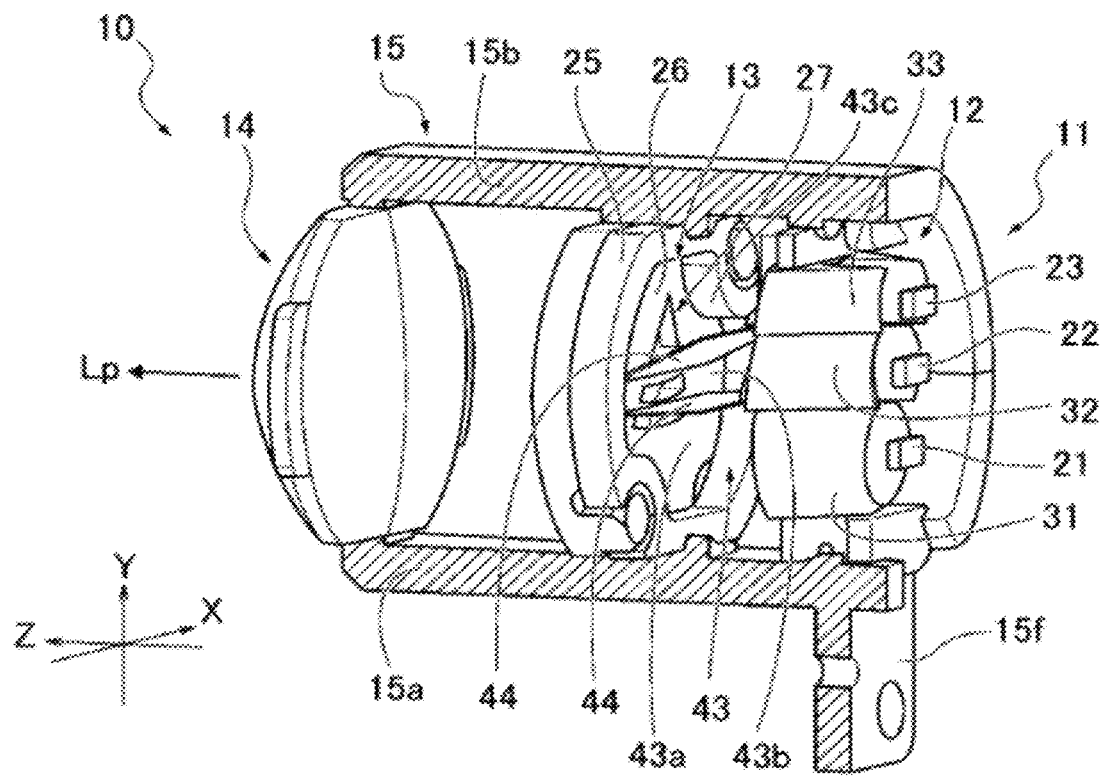
FIG. 3 is an explanatory diagram showing the configuration of the vehicle lighting fixture viewed from a different angle.

As shown in FIGS. 2 and 3, in the vehicular lamp 10, a light source unit 11, a condenser (light-collecting) lens 12, a shade 13, and a projection lens 14 are accommodated in a housing 15 to form a single projection optical system and constitute a road surface projection unit of a projector type. The housing 15 is composed of a substantially semi-cylindrical lower member 15a and an upper member 15b, and the lower member 15a and the upper member 15b are fitted to each other in a state where the respective members (12 to 14) are installed on the lower member 15a. The housing 15 is provided with a condenser lens groove 15c into which the condenser lens 12 is fitted, a shade groove 15d into which the shade 13 is fitted, and a projection lens groove 15e into which the projection lens 14 is fitted. Further, in the housing 15, the lower member 15a is provided with a fixed piece 15f projecting downward in the vertical direction. The fixing piece 15f is used to attach the housing 15 to an arrangement position at the rear end of the vehicle 1, and in the first embodiment, the fixing piece 15f is fixed inside the reversing light. It should be noted that the configuration such as the shape of the housing 15 and the position where the housing 15 is attached may be appropriately set, and is not limited to the configuration of the first embodiment.

The light source unit 11 includes a first light source 21, a second light source 22, a third light source 23, and a substrate 24 on which the first light source 21, the second light source 22, and the third light source 23 are mounted. The three light sources (21, 22, 23) are composed of light emitting elements such as LEDs (Light Emitting Diodes). Each of the light sources (21, 22, 23) has basically the same configuration except that the positions to which they are attached are different, and in the first embodiment, white light (white light) is emitted with a Lambertian distribution centered on the emission optical axis. For each of the light sources (21, 22, 23), the color (wavelength band), distribution mode, number of colors, and the like may be appropriately set, and the configuration is not limited to the configuration of the first embodiment.

Figure 4:
FIG. 4 is an explanatory diagram showing the arrangement of each light source in both vehicle lighting fixtures.

As shown in FIG. 4, the three light sources (21, 22, 23) are arranged in parallel in the vertical direction at intervals on the substrate 24. The third light source 23 of the first embodiment is positioned above the projected optical axis Lp in the vertical direction and slightly inside the projected optical axis Lp in the width direction (toward the center of the vehicle 1 to be mounted). The second light source 22 of the first embodiment is positioned slightly above the projected optical axis Lp in the vertical direction and substantially just on the projected optical axis Lp in the width direction. The first light source 21 of the first embodiment is positioned below the projected optical axis Lp in the vertical direction and slightly outside the projected optical axis Lp in the width direction (outer edge side of the vehicle 1 to be mounted). For this reason, the three light sources (21, 22, 23) have a positional relationship in which the three light sources (21, 22, 23) are inclined in the vertical direction so as to move outward from the third light source 23 toward the first light source 21.

As shown in FIG. 2 etc., three light sources (21, 22, 23) are mounted on the substrate 24. The substrate 24 is provided with a lighting control circuit, and power is supplied from the circuit as appropriate to light the respective light sources (21, 22, 23) as appropriate. The substrate 24 is fixed to a heat sink formed of aluminum die-cast or resin having thermal conductivity, and releases heat generated in the light source unit 11 to the outside. The substrate 24 is fixed to a rear end portion (an end portion on the right side in the optical axis direction as viewed from the front in FIGS. 2 and 3) of the housing 15 in a state of being fixed to the heat sink, and is opposed to the condenser lens 12 (the incident surface 34) accommodated in the housing 15.

The condenser lens 12 is a non-imaging lens for condensing light emitted from three light sources (21, 22, 23), and has a first condenser lens portion (section) 31, a second condenser lens portion 32, and a third condenser lens portion 33 arranged in the vertical direction. Therefore, in the first embodiment, the vertical direction is the first direction in which the respective condenser lens portions (31, 32, 33) are stacked. The first condenser lens portion 31 faces with (is opposed to) the first light source 21 in the optical axis direction (positioned on the outgoing optical axis of the first light source 21), and collects light from the first light source 21 into a region of the shade 13 where a first slit portion 281 described later is provided. The second condenser lens portion 32 faces with the second light source 22 in the optical axis direction (positioned on the outgoing optical axis of the second light source 22), and collects light from the second light source 22 into a region of the shade 13 where a second slit portion 282 described later is provided. The third condenser lens portion 33 faces with the third light source 23 in the optical axis direction (positioned on the output optical axis of the third light source 23), and collects light from the third light source 23 into a region of the shade 13 where a third slit portion 283 described later is provided.

The condenser lens 12 is provided with mounting projections 12a on the upper side and the lower side in the vertical direction, respectively. The projecting ends of the mounting projections 12a can be fitted into the condenser lens groove 15c of the housing 15, and the mounting projections 12a can be attached to the housing 15. The optical configuration of each condenser lens portion (31, 32, 33) will be described later.

The shade 13 is an example of a light shielding member that forms an illumination pattern Pi by partially transmitting the light from each light source (21, 22, 23) condensed by the condenser lens 12. In the illumination pattern PiAs shown in FIG. 1, three illumination patterns Di are arranged at substantially equal intervals in the direction away from the vehicle 1. Here, when each illumination pattern Di is individually shown, the one farthest from the vehicle 1 is set as the first illumination pattern Di1, and the second illumination pattern Di2 and the third illumination pattern Di3 are set as the second illumination pattern Di2 and the third illumination pattern Di3 in order from the first illumination pattern Di1 toward the vehicle 1. Therefore, in the illumination pattern Pi, the first illumination pattern Di1 becomes a distant illumination pattern, the third illumination pattern Di3 becomes a near illumination pattern, and the second illumination pattern Di2 between them becomes an intermediate illumination pattern.

The illumination pattern Pi of the first embodiment is obtained by dividing a fan shape having an apex in the vicinity of the corner of the rear end of the vehicle 1 into three parts in the radial direction thereof. The third illumination pattern Di3 is defined as a fan shape that includes the mentioned vertex, the second illumination pattern Di2 is arched with intervals along the outer edge of the third illumination pattern Di3, and the first illumination pattern Di1 is also arched with intervals along the outer edge of the second illumination pattern Di2. Consequently, the three illumination patterns Di are provided within equal angular ranges, with the first illumination pattern Di1 being the largest and the third illumination pattern Di3 being the smallest.

The illumination pattern Pi is positioned on a reference line Lb on which the inner ends of the illumination patterns Di are equal to each other on the road surface 2 as a projection surface. The reference line Lb serves as a reference of a position where each illumination pattern Di is provided, extends along the traveling direction of the vehicle 1 at positions on each side surface in the left-right direction (direction orthogonal to the traveling direction) of the vehicle 1, and indicates the vehicle width of the vehicle 1 between the reference lines Lb. The illumination pattern Pi is formed into a fan shape which spreads outward in the left-right direction from the reference line Lb, so that the illumination pattern Pi spreads to the outside of the vehicle 1 in the left-right direction at the rear of the vehicle 1. The illumination pattern Pi can be seen to indicate the rear of the vehicle 1 by arranging the three illumination patterns Di. In particular, since the illumination pattern Pi of the first embodiment is lit in order from the illumination pattern Di on the side close to the vehicle 1, that is, in order of the third illumination pattern Di3, the second illumination pattern Di2, and the first illumination pattern Di1, the illumination pattern Pi can be seen to spread obliquely rearward of the vehicle 1. The illumination pattern Pi composed of the three illumination patterns Di is formed by the shade 13.

As shown in FIGS. 2 and 3, in the shade 13, a shade portion 25 is provided in the shade frame portion 26. The shade frame portion 26 is formed into a frame shape surrounding the shade portion 25, and can be fitted into the shade groove 15d of the housing 15 and attached to the housing 15. In the shade frame portion 26 of the first embodiment, an upper end and a lower end in the vertical direction are partially cut out in the width direction. In the shade 13, the center position of the shade portion 25 is positioned on the projection optical axis Lp by fitting the shade frame portion 26 into the shade groove 15d.

Figure 5:
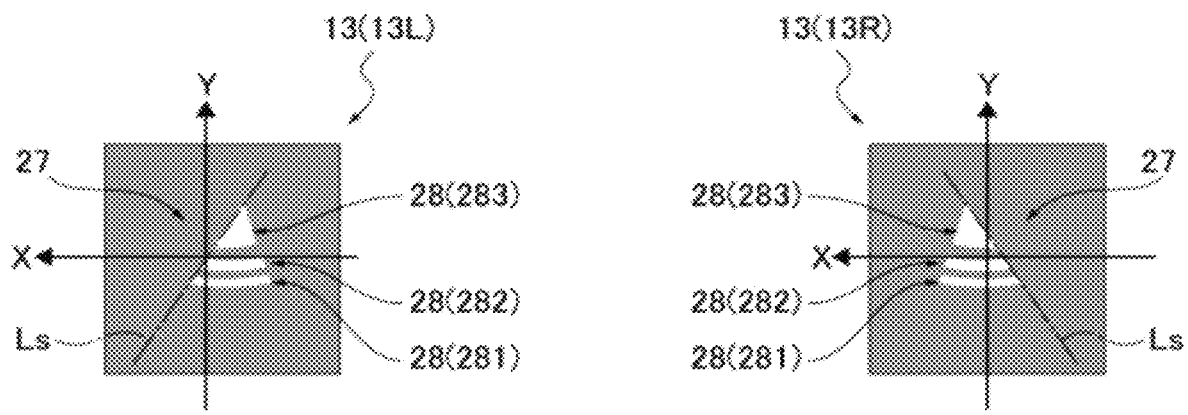
FIG. 5 is an explanatory diagram showing the individual slit portions of the shade in both vehicle lighting fixtures.

The shade portion 25 is basically formed of a plate-like member which blocks transmission of light, and is provided with an illumination slit 27 through which the member is partially cut out. The illumination slit 27 partially passes the light from each light source (21, 22, 23) condensed by the condenser lens 12, thereby forming the illumination pattern Pi into a predetermined shape. The illumination slit 27 corresponds to the illumination pattern Pi. And as shown in FIG. 5, in the first embodiment, the illumination slit 27 is composed of three slit portions 28. Therefore, each of the slit portions 28 functions as a light transmitting portion through which light is partially transmitted. Here, in this specification, the term "light transmission" means transmission of light, and includes transmission of light through a gap of an object such as a slit or transmission of light such as a filter.

The three slit portions 28 correspond to the three illumination patterns Di in a one to-one manner. Since the projection lens 14 inverts the shade 13 (the illumination slit 27) and projects the respective slit portions 28 onto the road surface 2, the respective slit portions 28 are rotationally symmetric with respect to the positional relationship of the respective illumination symbols Di of the illumination pattern Pi about the projection optical axis Lp (see FIGS. 1, 3, 5, etc.). For this reason, in each of the slit portions 28, the first slit portion 281 at the lowest side in the vertical direction becomes a far slit portion corresponding to the first illumination pattern Di1 (far illumination pattern) of the illumination pattern Pi. Further, in each slit portion 28, the second slit portion 282 on the slit portion 28 becomes an intermediate slit portion corresponding to the second illumination pattern Di2 (intermediate illumination pattern). In each of the slit portions 28, the third slit portion 283 on the uppermost side becomes a near slit portion corresponding to the third illumination pattern Di3 (near illumination pattern).

In the shade portion 25, a slit reference line Ls (light-transmitting or translucent portion reference line) is set. The slit reference line Ls corresponds to a reference line Lb of the illumination pattern Pi in each slit portion 28 (illumination slit 27). The slit reference line Ls serves as a reference of a position at which each slit portion 28 is provided, and an outer end portion in the width direction of each slit portion 28 is provided on the slit reference line Ls. The slit reference line Ls is inclined in the vertical direction, and in the first embodiment, the slit reference line Ls is inclined from the upper side to the lower side in the vertical direction so as to extend from the inner side in the width direction (the center side of the vehicle 1) to the outer side. The positions of the slit portions 28 on the shade portion 25 are set so that the respective illumination patterns Di have a desired positional relationship on the road surface 2. In the shade 13 of the first embodiment, the third slit portion 283 is provided above the projection optical axis Lp in the vertical direction, the second slit portion 282 is provided below a horizontal line including the projection optical axis Lp near the horizontal line, and the first slit portion 281 is provided below the horizontal line.

Each of the slit portions 28 has the same shape as each corresponding illumination pattern Di, and the upper, lower, left, and right sides are inverted with respect to each illumination pattern Di. In other words, the third slit portion 283 is configured in a fan shape, the second slit portion 282 is arched with intervals along the outer edge of the third slit portion 283 on its lower side, and the first slit portion 281 is arched with intervals along the outer edge of the second slit portion 282 on its lower side. The light passing through the shade 13 (each slit portion 28 of the illumination slit 27) is projected onto the road surface 2 by the projection lens 14. The sizes and intervals of the three slit portions 28 are set in accordance with the distance to the road surface 2 so that the respective illumination patterns Di on the road surface 2 are approximately equal in size as shown in FIG. 1 etc. described above. Specifically, in the vehicular lamp 10, since the distance from the shade 13 and the projection lens 14 to the road surface 2 are different because the projection optical axis Lp is provided to be inclined with respect to the road surface 2, so that when the vehicular lamp 10 is projected onto the road surface 2 by the projection lens 14, each slit portion 28 (each illumination pattern Di which is the light passing through the slit portion 28) has a size and an interval corresponding to the distance.

The projection lens 14 is a lens for imaging, and is formed as a convex lens having a substantially circular shape when viewed in the optical axis direction, and as shown in FIGS. 2 and 3, is formed as a free-form surface having a convex entrance surface and a convex exit surface. The projection lens 14 projects the illumination slit 27 (each slit portion 28) of the shade 13 to form an illumination pattern Pi on the road surface 2 inclined with respect to the projection optical axis Lp (see FIG. 1 ets.). The incident surface and the exit surface may be convex or concave as long as the projection lens 14 is a convex lens, and are not limited to the configuration of Embodiment 1. When the projection lens 14 is fitted into the projection lens groove 15e of the housing 15, the projection lens 14 is attached to the housing 15 in a state in which the optical axis of the projection lens 14 coincides with the projection optical axis Lp. In other words, the projection lens optical axis of the projection lens 14 becomes the projection optical axis Lp.

Figure 6:
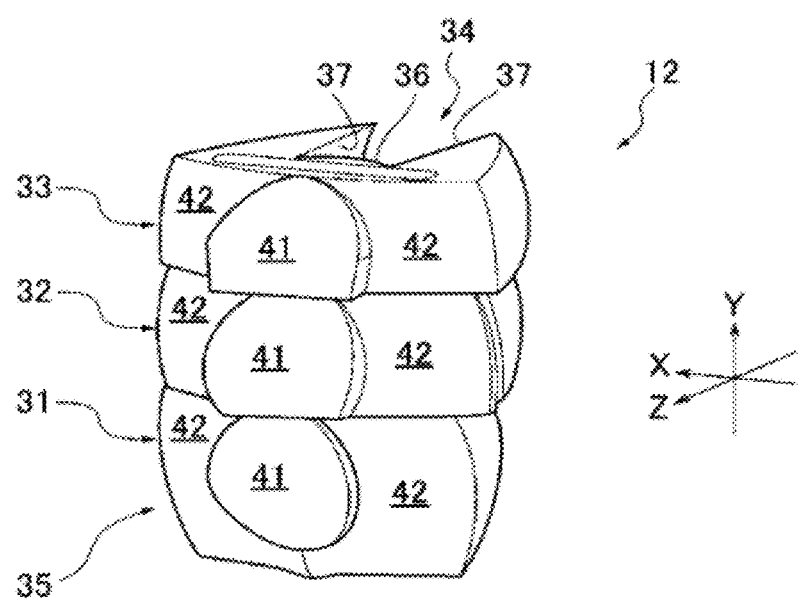
FIG. 6 is an explanatory diagram showing the condenser lens.

Next, the configuration of the condenser lens 12 will be described with reference to FIGS. 6 to 12. As shown in FIG. 6, the condenser lens 12 has a substantially rectangular shape that is long in the width direction when the respective condenser lens portions (31, 32, 33) are viewed from the front in the optical axis direction, and the condenser lens 12 is configured by stacking the first condenser lens portion 31, the second condenser lens portion 32, and the third condenser lens portion 33 in order from the bottom. The condenser lens 12 of the first embodiment has substantially the same size (width direction and vertical direction) as the shade portion 25 of the shade 13 in a state in which the respective condenser lens portions (31, 32, 33) are stacked (see FIGS. 2 and 3). As a whole, the condenser lens 12 appropriately collects the spread light emitted from each light source (21, 22, 23) into the corresponding slit section 28 (the periphery thereof) and advances the light to the shade section 25.

The size of the condenser lens 12 in the vertical direction is the largest in the first condenser lens portion 31 and the smallest in the third condenser lens portion 33. In the condenser lens 12 of Embodiment 1, the ratio of the sizes in the vertical direction is 5:4:3 for the first condenser lens portion 31, the second condenser lens portion 32, and the third condenser lens portion 33. Therefore, the first condenser lens portion 31 receives the largest amount of light from the first light source 21, and the third condenser lens portion 33 receives the smallest amount of light from the third light source 23.

As shown in FIGS. 7 and 9, the condenser lens 12 has an incident surface 34 facing the light source unit 11 and an exit surface 35 facing the opposite side. In the condenser lens 12 of the first embodiment, the incident surface 34 and the emission surface 35 are optically set so as to appropriately irradiate each slit portion 28 of the shade 13 with light emitted from the light source portion 11, that is, each light source (21, 22, 23). In the condenser lens 12, each condenser lens portion (31, 32, 33) has an entrance surface 34 and an exit surface 35, and each of the condenser lens portions (31, 32, 33) is optically set individually in accordance with the corresponding slit portion 28. In each of the condenser lens portions (31, 32, 33), except for fine optical settings caused by the difference in size and shape of the corresponding slit portion 28, the basic configurations of the incident surface 34 and the exit surface 35 and the basic concept of light collection with respect to the slit portion 28 are made equal. Therefore, in the following description, the configurations and optical settings of the incident surface 34 and the exit surface 35 will be described by taking the first condenser lens portion 31 (31R) of the vehicular lamp 10 (10R) provided on the right side of the vehicle 1 as an example, and the configurations and optical settings of the remaining second condenser lens portion 32 and third condenser lens portion 33 will be omitted.

The incident surface 34 of the first condenser lens portion 31 has an on-axis incident surface section 36 whose central portion is recessed toward the inside of the condenser lens 12 (the side opposite to the light source section 11) and which is curved to protrude outward at the center thereof, and an inclined incident surface section 37 surrounding the on-axis incident surface section 36.

At the periphery of the incident surface 34 of the first condenser lens portion 31, a reflecting surface 38 in the form of a truncated cone surrounding the inclined incident surface section 37 is provided.

The on-axis incidence surface portion 36 is provided on the outgoing optical axis so as to face the first light source 21 in the optical axis direction, and the first light source 21 is positioned in the vicinity of point (rear focal point). The on-axis incidence surface portion 36 converges the light emitted from the first light source 21 so as to advance toward an inner emission surface section 41 of the incidence surface 34, which will be described later, and enters the light into the condenser lens 12 (see FIG. 7).

The inclined entrance surface portion 37 is provided so as to project toward the first light source 21, and allows light from the first light source 21 which does not advance to the on-axis entrance surface portion 36 to enter the condenser lens 12. The reflecting surface 38 is provided at a position where the light incident from the inclined incident surface section 37 into the condenser lens 12 travels. The reflecting surface 38 reflects the light incident from the inclined incident surface section 37 and converges the light so as to progress toward an outer exit surface section 42 of the incident surface 34 (see FIG. 9). The reflecting surface 38 may reflect light by utilizing total reflection, or may reflect light by adhering aluminum, silver, or the like by vapor deposition or coating. Thus, the incident surface 34 efficiently allows the light emitted from the first light source 21 to enter and guide the light to the exit surface 35.

Therefore, in the condenser lens 12, on the incident surface 34, the light that has passed through the on-axis incident surface section 36 directly becomes direct light toward the exit surface 35, and the light that has passed through the inclined incident surface section 37 and is reflected by the reflection surface 38 becomes reflected light toward the exit surface 35 after being internally reflected. Since the incident surface 34 of each condenser lens portion (31, 32, 33) has the above-described configuration, this condenser lens 12 has a function of efficiently using the light emitted from the corresponding light source (21, 22, 23).

The emission surface 35 emits the light incident from the incidence surface 34 to the front side in the front-back direction. As shown in FIG. 6, the exit face 35 has a substantially rectangular shape elongated in the width direction as viewed from the front in each of the condenser lens portions (31, 32, 33), and has an inner exit surface section 41 and an outer exit surface section 42 with different optical settings. The inner exit surface section 41 is provided in the vicinity of the center of the exit face 35 in a region where the light having passed through the on-axis entrance face portion 36 travels (see FIG. 7). The inner exit surface section 41 of the first embodiment has a substantially circular shape as viewed from the front. The inner exit surface section 41 protrudes to the outside of the condenser lens 12 (toward the projection lens 14 (front side in the front-rear direction)) than the outer exit surface section 42.

As shown in FIG. 7, the inner exit surface section 41 refracts the light that has passed through the on-axis entrance surface portion 36, thereby diffusing the light in the width direction (horizontal direction) and advancing toward the front side in the front-back direction. The inner exit surface section 41 forms a plurality of light distribution images of the first light source 21 on the shade 13 (each slit section (28) of the shade section 25) by irradiating light passing through an on-axis incidence surface section 36 from the first light source 21, so as to appropriately overlap a plurality of light distribution images of the first light source 21 at positions corresponding to optical characteristics. The optical characteristics can be set by adjusting the curvature (surface shape) of the inner exit surface section 41 as well as the on-axis incidence surface portion 36 for each position, and in the first embodiment, the optical characteristics are set by gradually changing the curvature. The inner emission surface section 41 forms an inner region Ai shown in FIG. 8 by irradiating the shade 13 with the light emitted from the first light source 21 and passed through the on-axis incidence surface portion 36. The inner region Ai includes the entire area of the first slit portion 281 corresponding to the first condenser lens portion 31 (first light source 21). In the inner region Ai, the entire area of the first slit portion 281 has a substantially uniform light amount.

The outer emission surface portion 42 is provided in a region (outside in the width direction of the inner emission surface section 41 (see FIG. 6 etc.)) sandwiching the inner emission surface section 41 in the width direction, and is positioned in a region where light reflected from the first light source 21 through the inclined incidence surface portion 37 by the reflection surface 38 travels as shown in FIG. 9. The outer exit surface section 42 is positioned (recessed) on the inner side (rear side in the front-rear direction) of the condenser lens 12 than the inner exit surface section 41. The outer exit surface section 42 refracts the light reflected by the reflection surface 38 from the first light source 21 through the inclined incidence surface section 37, and advances the light toward the front side in the front-back direction so that the light is condensed at a predetermined position (region) on the first slit section 281 corresponding to the first condenser lens portion 31 (first light source 21). By irradiating the light reflected by the a plurality of light distribution images of the first light source 21 plurality of light distribution images of the first light source 21 on the shade 13 at positions corresponding to the optical characteristics by appropriately superimposing the light distribution images on the shade 13. This optical characteristic can be set by adjusting the curvature (surface shape) of the outside emission surface portion 42 as well as the reflection surface 38 for each position, and in the first embodiment, the curvature is set by gradually changing.

Figure 10:
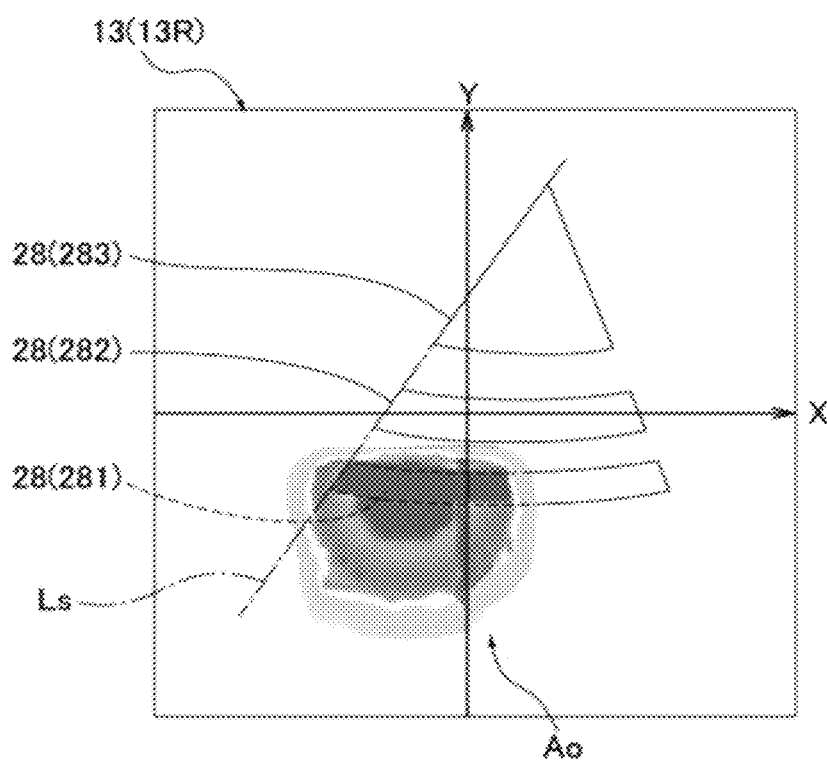
FIG. 10 is an explanatory diagram showing the light distribution (outer region) formed by the light shown in FIG. 9 on the shade.
Figure 11:
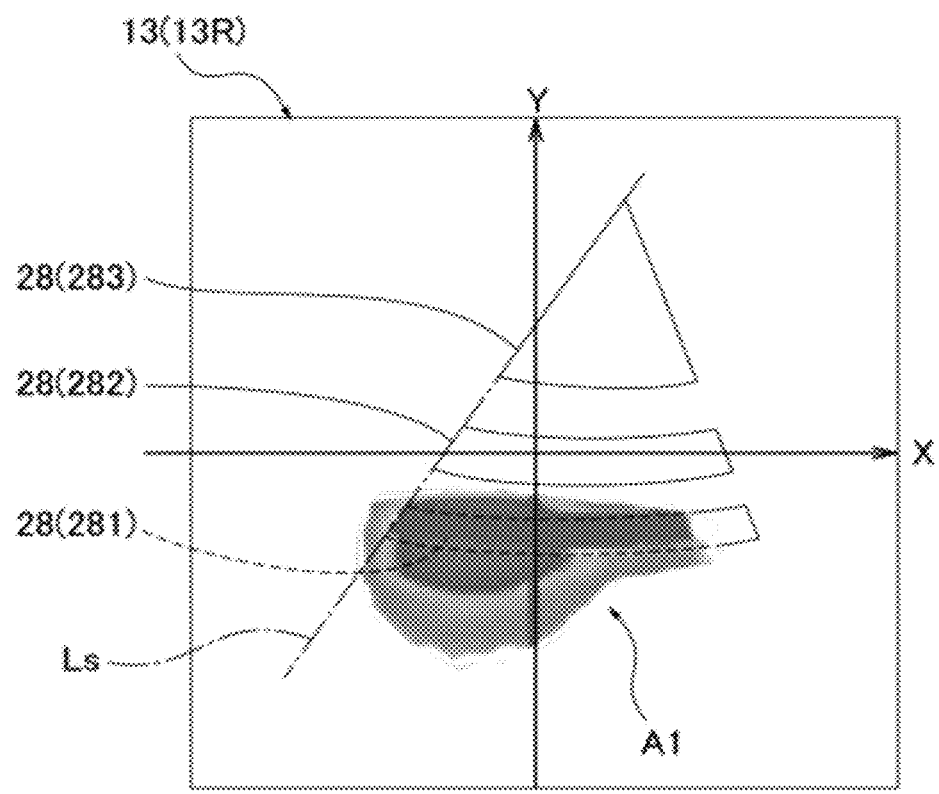
FIG. 11 is an explanatory diagram showing the light distribution (Region 1) formed by the light shown in FIG. 7 and the light shown in FIG. 9 on the shade.

The outer exit surface section 42 forms an outer region Ao shown in FIG. 10 by irradiating the shade 13 with the light emitted from the first light source 21, passed through the inclined incoming surface portion 37, and reflected by the reflecting surface 38. The outer region Ao partially brightens the predetermined position described above. The predetermined position is set from the viewpoint of compensating for the light distribution caused by the light from the first light source 21 passing through the inner emission surface section 41 in order to make the first illumination pattern Di1 formed on the road surface 2 by the light passing through the first slit portion 281 into a desired brightness. The outer region Ao in the first embodiment is set from the viewpoint of ensuring the brightness in the vicinity of the reference line Lb in the illumination pattern Pi, and the slit reference line Ls side on the first slit portion 281 is partially brightened. In the outer region Ao, a region near the slit reference line Ls of the first slit portion 281 is set to be brighter than the inner region Ai as a maximum value of the light amount, and a region up to an intermediate position in the width direction of the first slit portion 281 is set to be a bright region.

As described above, the first condenser lens portion 31 forms an inner region Ai that mainly brightens the entire area of the first slit portion 281 by the light passing through the inner exit surface section 41, and forms an outer region Ao that brightens the vicinity of the slit reference line Ls of the first slit portion 281 by the light passing through the outer exit surface section 42. Then, the first condenser lens portion 31 emits the light from the first light source 21 from the inner exit surface section 41 and the outer exit surface section 42 as described above, thereby forming the first region A1 shown in FIG. 11. The first area A1 is formed by overlapping the inner area Ai and the outer area Ao, and while the entire area of the first slit portion 281 is brightened, the area near the slit reference line Ls of the first slit portion 281 is brightened most.

In the condenser lens 12, the second condenser lens portion 32 and the third condenser lens portion 33 are basically the same configuration as the first condenser lens portion 31, and optical settings are made based on the same concept as that of the first condenser lens portion 31. That is, the second condenser lens portion (32) forms an inner region which mainly brightens the entire area of the second slit section (282) by light from the second light source (22) which has passed through the inner emitting surface section (41), and forms an outer region centering around the slit reference line (Ls) of the second slit section (282) by light from the second light source (22) which has passed through the outer emitting surface section (42). Thus, the second condenser lens portion 32 emits the light from the second light source 22 from the inner exit surface section 41 and the outer exit surface section 42 as described above, thereby overlapping the inner region and the outer region to form the second region. This second region is formed by overlapping an inner region and an outer region, and while the entire area of the second slit portion 282 is brightened, the area near the slit reference line Ls of the second slit portion 282 is brightened most.

Further, the third condenser lens portion 33 forms an inner region which mainly brightens the entire area of the third slit section 283 by the light from the third light source 23 which has passed through the inner emitting surface section 41, and forms an outer region centering around the slit reference line (Ls) of the third slit section 283 by the light from the third light source 23 which has passed through the outer emitting surface section 42. Thus, the third condenser lens portion 33 emits the light from the third light source 23 from the inner exit surface section 41 and the outer exit surface section 42 as described above, thereby overlapping the inner region and the outer region to form the third region. This third region is formed by overlapping an inner region and an outer region, and while the entire region of the third slit portion 283 is brightened, the region near the slit reference line Ls of the third slit portion 283 is brightened most.

As described above, the condenser lens 12 condenses light from each light source (21, 22, 23), so that the whole area of each slit portion 28 can be brightened on the shade 13 while making the vicinity of the slit reference line Ls of each slit portion 28 the brightest. In this way, the condenser lens 12 brightens the entire area of the corresponding slit portion 28 mainly by the light from the respective light sources (21, 22, 23) passing through the inner exit surface section 41, and supplements the partial brightness in the corresponding slit portion 28 by the light from the respective light sources (21, 22, 23) passing through the outer exit surface section 42. Thus, the condenser lens 12 has a function of providing each slit portion 28 with a desired light distribution.

As shown in FIGS. 2 and 3, in the vehicular lamp 10, a plurality of light-shielding plates 44 are provided in a light-condensing optical path 43 between the light-condenser lens 12 (the respective condenser lens portions (31, 32, 33)) and the shade 13 (the respective slit portions 28 thereof). The condensing optical path 43 is an optical path through which the condenser lens 12 condenses light from each light source (21, 22, 23) onto the shade 13.

The plurality of light-shielding plates 44 are formed of a plate-like member that blocks transmission of light. The light-shielding plate 44 partitions the light-condensing optical path 43 for each combination of each condenser lens portion (31, 32, 33) and the corresponding slit portion 28. That is, in the light condensing optical path 43, the light shielding plate 44 is provided between the space extending from the first condenser lens portion 31 to the first slit portion 281 and the space extending from the second condenser lens portion 32 to the second slit portion 282. Further, in the condensing optical path 43, a light shielding plate 44 is provided between a space extending from the second condenser lens portion 32 to the second slit portion 282 and a space extending from the third condenser lens portion 33 to the third slit portion 283. As described above, the condensing optical path 43 is divided by the two light shielding plates 44 into a first optical path portion 43a extending from the first condenser lens portion 31 to the first slit portion 281, a second optical path portion 43b extending from the second condenser lens portion 32 to the second slit portion 282, and a third optical path portion 43c extending from the third condenser lens portion 33 to the third slit portion 283. Therefore, in the light-condensing optical path 43, it is possible to prevent the light from each of the condenser lens portions (31, 32, 33) from proceeding to the corresponding slit portion 28 (so-called crosstalk).

The vehicular lamp 10 is assembled as follows with reference to FIGS. 2 and 3. First, three light sources (21, 22, 23) are mounted on the substrate 24, and the light source unit 11 is assembled. Further, in the lower member 15a of the housing 15, both mounting projections 12a of the condenser lens 12 are fitted into the condenser lens groove 15c, the shade frame portion 26 of the shade 13 is fitted into the shade groove 15d, and the projection lens 14 is fitted into the projection lens groove 15e. Then, the housing 15 is constituted by fitting the upper member 15b to the lower member 15a, and the light source unit 11 fixed to the substrate 24 and the heat sink is fixed to the rear end portion (the right end portion in the optical axis direction as viewed from the front in FIGS. 2 and 3) side. Then, while the condenser lens 12, the shade 13, and the projection lens 14 are accommodated in the housing 15, the light source unit 11 is provided facing the condenser lens 12. Thus, the condenser lens 12, the shade 13, and the projection lens 14 are arranged on the projection optical axis Lp in a predetermined positional relationship in order from the side of the light source unit 11, and the vehicular lamp 10 is assembled. The vehicular lamp 10 is provided in a lamp chamber of a reversing lamp in a state where the projected optical axis Lp is directed obliquely to the rear side of the outside of the vehicle 1 and is inclined with respect to the road surface 2 around the vehicle 1 (see FIG. 1).

Next, the operation of the vehicular lamp 10 will be described. The vehicular lamp 10 supplies electric power from a lighting control circuit to each light source (21, 22, 23) from a substrate 24, thereby turning on and off the light sources as appropriate. Light from each light source (21, 22, 23) is condensed by a condenser lens (12) to irradiate a shade (13), passes through an illumination slit (27) (each slit portion (28)), and is projected by a projection lens (14), thereby forming an illumination pattern (Pi) on a projection surface (a road surface (2) when mounted on a vehicle (1)).

Figure 12:
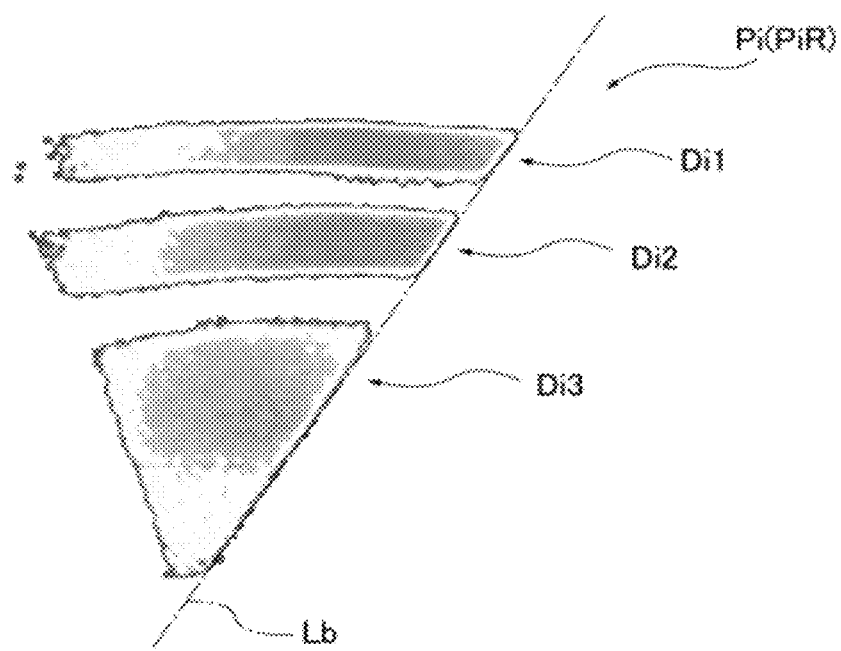
FIG. 12 is an explanatory diagram showing the illumination pattern formed by the vehicle lighting fixture provided on the right side of the vehicle, which intersects with the projection axis, on a screen.

In the illumination pattern Pi, three illumination patterns Di are arranged with the inner end portion positioned on the reference line Lb by projecting the light passing through the illumination slit 27 (each slit portion 28) of the shade 13 having the above-described light distribution by the projection lens 14. FIG. 12 shows an illumination pattern Pi formed on a screen orthogonal to the projection optical axis Lp. In the illumination pattern Pi of FIG. 12, unlike the case where the illumination pattern Pi is formed on the road surface 2 from the vehicle 1, the light distribution formed in each slit portion 28 by the condenser lens 12 is reflected substantially as it is. In the illumination pattern Pi of FIG. 12, the whole area of each slit portion 28 is brightened, and the side of the reference line Lb (the right side as viewed from the front) of each slit portion 28 is brightened most.

When the illumination pattern (Pi) is formed on the road surface (2) of the vehicular lamp (10), the brightness decreases according to the distance to each illumination pattern (Di) due to the inclination with respect to the road surface (2) in the state in which the vehicular lamp (10) is provided, so that each illumination pattern (Di) has substantially uniform brightness over its entire area. In other words, the vehicular lamp 10 sets the light distribution in each of the slit portions 28 in consideration of the influence of the inclination on the road surface 2 so as to obtain a desired light distribution of the illumination pattern Pi on the road surface 2. Here, in each illumination pattern Di, since the vicinity of the slit reference line Ls is brightened in each slit portion 28 (on the illumination slit 27), the outline of each slit portion 28 can be made clear. Therefore, in each illumination pattern (Di), even when the difference in brightness between the two patterns is equalized, the difference in brightness in the vicinity of the reference line (Lb) to which the slit reference line (Ls) corresponds can be made clear, the contour can be clearly grasped, and the portion along the reference line (Lb) can be easily seen.

Figure 13:
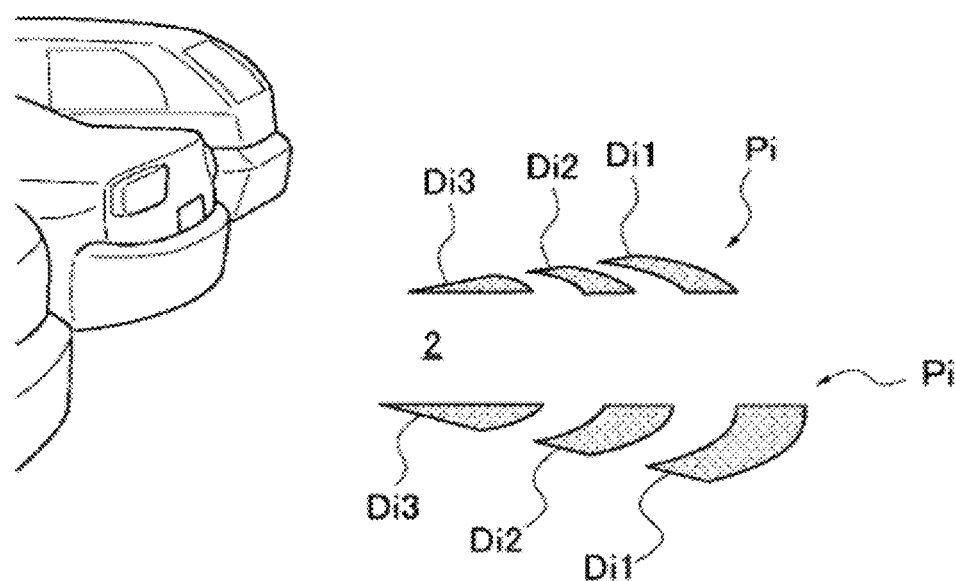
FIG. 13 is an explanatory diagram showing the appearance of both illumination patterns formed by the vehicle lighting fixture according to Embodiment 1, installed on a vehicle and viewed from the surroundings.

The vehicular lamp 10 is interlocked with a back lamp, and when the vehicle 1 is moved backward (backward) (the drive gear is moved backward), the third light source 23, the second light source 22, and the first light source 21 are lit in this order. At this time, when the third light source 23 and the second light source 22 are turned on once, the lighting state is maintained, and the third light source 23 and the second light source 22 are turned off simultaneously with the turning off of the first light source 21 which was turned on last. Thus, as shown in FIG. 13, the lamp 10 for both vehicles turns on the third illumination pattern Di3, the second illumination pattern Di2, and the first illumination pattern Di1 in this order on the road surface 2 behind the vehicle 1 to form a pair of illumination patterns Pi. Therefore, the vehicular lamp (10) can form the illumination pattern (Pi) up to a distant position behind the vehicle (1) and make the illumination pattern (Pi) visible even when, for example, a person around the scene in which the vehicle (1) is about to reverse from a parked state cannot or is difficult to see the reversing light of the vehicle (1). In addition, since the vehicular lamp 10 forms the illumination pattern Pi by lighting the third illumination pattern Di3, the second illumination pattern Di2, and the first illumination pattern Di1 in this order, it is possible to instantly know that the vehicle 1 is going backward, and to call attention to the rear of the vehicle 1.

In addition, in the vehicular lamp 10, in each illumination pattern Di of the left and right illumination patterns Pi to be formed, the ends inside in the left-right direction of the vehicle 1 are aligned on a reference line Lb (see FIG. 1), and the reference line Lb extends in the traveling direction of the vehicle 1 at positions on each side surface in the left-right direction of the vehicle 1. Therefore, the vehicular lamp 10 can make a driver or the like recognize the width dimension of the vehicle 1 through an object around the vehicle 1 or an image from a camera or the like of the vehicle 1. Therefore, the vehicular lamp 10 can be used as a parking aid for the vehicle 1 by using the illumination pattern Pi, for example, in a scene where the vehicle 1 is parked.

Further, in the vehicular lamp 10, the ratio of the size in the vertical direction of the condenser lens 12 is 5:4:3=first condenser lens portion 31:second condenser lens portion 32:third condenser lens portion 33. Therefore, in the vehicular lamp (10), as the position at which the illumination pattern (Di) is formed is further away, the condenser lens portion (31, 32, 33) corresponding to the position is made larger, so that as the position at which the illumination pattern (Di) is formed is further away, the degree of light collection from the corresponding light source (21, 22, 23) can be increased. Here, it is assumed that the illumination patterns Di are illuminated in an order from near to far. Therefore, in the vehicular lamp 10, the size of each condenser lens portion (31, 32, 33) in the first direction (vertical direction) in which the condenser lens portions (31, 32, 33) are superposed on each other is made larger as the condenser lens portions (31, 32, 33) correspond to the light sources (21, 22, 23) which are lit later in order. Thus, the vehicular lamp (10) can compensate for the darkening of the illuminated pattern (Di) in accordance with the difference in the formed distance by the difference in the amount of incident light, and can reduce the difference in brightness between the illuminated patterns (Di) caused by the difference in the distance.

A vehicular lamp (10) can reduce the difference in brightness between illuminated patterns (Di) caused by the difference in distance by adjusting the size of each condenser lens portion (31, 32, 33) in a condenser lens (12), and therefore can suppress an increase in size for reducing the difference in brightness. This is due to the following. First, if each illumination pattern Di is simply made bright, the condenser lens 12, the shade 13, and the projection lens 14 may be made large for each light source (21, 22, 23). However, when the respective parts (12, 13, 14) are enlarged in this way, the whole is enlarged. Therefore, it is conceivable to increase the incident amount of light from each light source (21, 22, 23) while suppressing the overall enlargement by increasing the size of each condenser lens portion (31, 32, 33) without increasing the size of the shade 13 and the projection lens 14. However, if only each condenser lens portion is enlarged, the angle with respect to the projection optical axis Lp in the direction from the condenser lens portion (reference numerals 31 and 33 in the first embodiment) distant from the projection optical axis Lp toward the corresponding slit portion 28 of the shade 13 becomes large. Then, since the influence of the off-axis aberration in the projection lens 14 becomes large for the light traveling in such a direction, it becomes difficult to appropriately form the corresponding illumination pattern Di, that is, the illumination pattern Pi. On the other hand, in the vehicular lamp 10, the size of the condenser lens 12 is substantially equal to that of the shade 13 and the projection lens 14, and the ratio of the respective condenser lens portions (31, 32, 33) in the first direction (vertical direction) of the condenser lens 12 is increased as the lighting order of the light sources (21, 22, 23) is delayed. Therefore, the vehicular lamp 10 can reduce a difference in brightness between the illumination patterns Di caused by a difference in distance while suppressing an increase in size. In particular, in the vehicular lamp 10, since the condenser lens 12 is formed by integrating the respective condenser lens portions (31, 32, 33), the vehicular lamp 10 can contribute to further miniaturization and can appropriately form the respective illumination patterns Di. This is because, for example, when the respective condenser lens portions are joined together with an adhesive or the like, the size becomes larger by the thickness of the adhesive and positioning of the condenser lens portions becomes difficult, which may affect the position or the like at which the respective illumination patterns Di are formed.

In a vehicular lamp 10, a light-collecting optical path 43 extending from each condenser lens portion (31, 32, 33) to a corresponding slit section 28 is partitioned by a light-shielding plate 44 for each corresponding combination. Therefore, the vehicular lamp 10 can prevent the light from each condenser lens portion (31, 32, 33) from proceeding to the corresponding slit portion 28 in the condensing optical path 43, and can form the desired illumination patterns Di, i.e., the illumination patterns Pi more clearly.

A vehicular lamp 10 is provided with each light source (21, 22, 23) tilted in the vertical direction so as to face outward from a third light source 23 toward a first light source 21, and a slit reference line (Ls) corresponding to a reference line (Lb) of an illumination pattern (Pi) in each slit section 28 (illumination slit 27) is tilted from the upper side to the lower side in the vertical direction so as to face from the inner side (the center side of a vehicle 1) to the outer side in the width direction. Therefore, in the vehicular lamp 10, the light sources (21, 22, 23) are arranged so as to be inclined to the side on which the reference line (Lb) is inclined on the light shielding member 13 with respect to the first direction (vertical direction) in which the condenser lens portions (31, 32, 33) are stacked. Thus, when the vehicular lamp 10 is projected onto the road surface 2 by the projection lens 14, the vehicular lamp 10 can have a positional relationship aiming at the respective illumination patterns Di, and can form a desired illumination pattern Pi on the road surface 2.

Here, the conventional vehicular lamp described in the prior art document is provided with a plurality of light guides individually corresponding to a plurality of light sources, and the light from each light source is efficiently utilized. In the conventional vehicular lamp, each light guide member diffuses light therein to emit light having a substantially uniform light distribution, and the shade (light shielding member) is irradiated with the light transmitted through each light guide member to make the light distribution on the shade substantially uniform. Further, since the conventional vehicular lamp has a configuration in which a shade is provided for each illumination slit and light from a light source corresponding to each light guide is guided on the shade, each light source is guided on a separate shade. For this reason, in the conventional vehicular lamp, the number of shades and light guides is increased every time the number of illumination patterns as the illumination pattern Pi is increased, so that the size of the whole configuration is increased. Further, in the conventional vehicular lamp, since light is guided by a light guide, it is difficult to obtain a desired light distribution as in the case where a region having a high light quantity is partially formed in a single illumination slit on a shade, and it is difficult to adjust the light distribution of an illumination pattern on a road surface.

On the other hand, the vehicular lamp 10 is provided with a single condenser lens 12 in which a condenser lens portion (31, 32, 33) for guiding light from each light source (21, 22, 23) inward from an incident surface 34 and emitting light from each light source from an exit surface 35 corresponds to each light source (21, 22, 23). In a condenser lens 12, a vehicular lamp 10 causes light emitted from each light source (21, 22, 23) in a direction substantially along a projected optical axis (Lp) to enter from an on-axis incidence surface section 36 of an incidence surface 34, and causes light emitted from each light source in a direction spreading (having a large angle with respect to the projected optical axis (Lp)) to enter from an inclined incidence surface section 37 of the incidence surface 34 and to be reflected by a reflection surface 38. The vehicular lamp 10 causes the light that has passed through the on-axis incidence surface section 36 to be emitted mainly from the inner exit surface section 41 of the emission surface 35, and causes the light that has passed through the inclined incidence surface section 37 and is reflected by the reflection surface 38 to be emitted mainly from the outer exit surface section 42 of the emission surface 35. Therefore, the vehicular lamp 10 can focus light from the light sources (21, 22, 23) to the corresponding slit sections 28 in a desired manner using the corresponding condenser lens portions (31, 32, 33), so that each slit section 28 can have a desired light distribution, and the light distribution of the illumination pattern (Pi) on the road surface can be adjusted. In particular, in the vehicular lamp 10 of the first embodiment, each of the condenser lens portions (31, 32, 33) can set the mode of light collection by the light emitted from the inner exit surface section 41 and the light emitted from the outer exit surface section 42, so that each of the slit portions 28 can be provided with a desired light distribution more easily and appropriately.

A vehicular lamp 10 uses a single condenser lens 12 formed by stacking condenser lens portions (31, 32, 33), and a plurality of slit sections 28 are provided in a single shade 13. Therefore, compared with a conventional vehicular lamp in which a shade is provided for each illumination slit and a light guide is provided for guiding light from each light source to each shade, the vehicular lamp 10 can suppress an increase in the size of the overall configuration.

The vehicular lamp 10 has a desired light distribution on the shade 13 by the single condenser lens 12. Specifically, the vehicular lamp 10 forms an inner region (Ai) on a shade 13 with light that has passed through an on-axis incidence surface section 36 of an incidence surface 34 and an inner exit surface section 41 of an emission surface 35, and forms an outer region (Ao) on the shade 13 with light that has passed through an inclined incidence surface section 37 of the incidence surface 34, is reflected by a reflection surface 38, and has passed through an outer exit surface section 42 of the emission surface 35. The vehicular lamp 10 forms each illumination region by forming the two regions (Ai, Ao) so as to overlap each of the slit portions 28 on the shade 13. In each of the irradiated regions, in each of the slit portions 28, the region near the slit reference line Ls which is on the reference line Lb side on the illumination pattern Pi is set as the maximum value of the light amount, and the entire region is set as bright. Therefore, the vehicular lamp 10 can irradiate the shade 13 with a desired light distribution by using a single condenser lens 12 for each light source (21, 22, 23).

As described above, the vehicular lamp 10 can have a simple structure and can be reduced in size as compared with the conventional vehicular lamp while forming the illumination pattern Pi to have a desired light distribution. Further, in the vehicular lamp 10, light from each light source (21, 22, 23) is guided inward for each corresponding condenser lens portion (31, 32, 33), emitted from the emission surface (35), and condensed in a single condenser lens 12, so that three light beams can be guided onto the corresponding slit section 28. Further, the vehicular lamp 10 irradiates two regions (Ai, Ao) having different positions, sizes, and light distribution distributions in each slit section 28 by utilizing the difference between two regions formed by an optical path passing through an on-axis incidence surface section (36) and an inner exit surface section 41 and an optical path passing through an inclined incidence surface section 37, a reflection surface 38, and an outer exit surface section 42 in a condenser lens 12. Therefore, even when a single condenser lens 12 is used for each light source (21, 22, 23), the vehicular lamp 10 can easily adjust the light distribution on the shade 13. Thus, compared with the conventional vehicular lamp, the vehicular lamp 10 can easily form a light distribution in each slit portion 28 on the shade 13 while suppressing an increase in size. In the vehicular lamp 10, the condenser lens portions (31, 32, 33) and the light sources (21, 22, 23) are individually associated with the respective slit sections 28, so that by turning on the respective light sources in order, the respective illumination patterns Di can be formed in order.

The vehicular lamp 10 of the first embodiment can obtain the following operational effects.

A vehicular lamp 10 is provided with a plurality of light sources (21, 22, 23), a condenser lens 12, a light-shielding member (shade 13), and a projection lens 14, wherein each light source is provided so as to individually correspond to a slit section 28 (light-transmitting section), and a plurality of condenser lens portions (31, 32, 33) in which the condenser lens 12 individually corresponds to the slit section 28 are superposed. Therefore, the vehicular lamp 10 can focus the light from each light source on the corresponding slit portion 28 in a desired manner by using the corresponding condenser lens portions. Thus, in the vehicular lamp 10, each of the slits 28 can have a desired light distribution, and the light distribution of the illumination pattern Pi on the road surface can be adjusted. Further, since the vehicular lamp 10 uses a single condenser lens 12 and is provided with a plurality of slit portions 28 in a single shade 13, an increase in the size of the overall configuration can be suppressed compared with a conventional vehicular lamp.

Disclosed is a vehicular lamp 10 wherein a plurality of condenser lens portions (31, 32, 33) have an on-axis incident surface section 36 provided on an incident surface 34 on the outgoing optical axis of a corresponding light source, and a plurality of inclined incident surface sections 37 inclined with respect to the on-axis incident surface section 36 (in embodiment 1, inclined incident surface sections 37 that form pairs with the on-axis incident surface section 36 interposed therebetween), and have reflection surfaces 38 corresponding to the respective inclined incident surface sections 37. Therefore, the vehicular lamp 10 can easily form a desired light distribution in each slit section 28 by utilizing a difference between two regions formed by an optical path passing through an on-axis incidence surface section 36 and an inner exit surface section 41 and an optical path passing through an inclined incidence surface section 37, a reflection surface 38 and an outer exit surface section 42.

A vehicular lamp 10 comprises a plurality of condenser lens portions (31, 32, 33) on an emission surface 35, an inner exit surface section 41 provided on the emission optical axis of a corresponding light source and corresponding to an on-axis incidence surface section 36, and an outer exit surface section 42 provided in pairs with the inner exit surface section 41 interposed therebetween and corresponding to a reflection surface 38. In the vehicular lamp 10, the inner exit surface section 41 spreads the light having passed through the on-axis incidence surface section 36 toward the entire corresponding slit section 28, and the outer exit surface section 42 collects the light from the reflection surface 38 toward a desired position in the corresponding slit section 28. Since the vehicular lamp 10 forms a plurality of light distribution images in which the light that has passed through the on-axis incidence surface section 36 does not change the shape of the corresponding light sources (21, 22, 23) so much, the vehicular lamp 10 can evenly irradiate the entire slit section 28. Further, in the vehicular lamp 10, although it is conceivable that the shape of a plurality of light distribution images of the corresponding light sources (21, 22, 23) is distorted by the light that has passed through the outer emission surface portion 42, the influence of the distortion can be extremely reduced because the light is partially condensed at a desired position. Therefore, the vehicular lamp 10 can easily and appropriately form a desired light distribution in each slit portion 28.

In a vehicular lamp 10, a plurality of light sources (21, 22, 23) are sequentially lit, and in a condenser lens 12, the size of a condenser lens portion (31, 32, 33) in a first direction (vertical direction) is made larger by the condenser lens portion (31, 32, 33) corresponding to the light sources (21, 22, 23) that are lit later in order. Therefore, even when the illumination patterns Di are turned on in an order from near to far, the vehicular lamp 10 can reduce a difference in brightness between the illumination patterns Di caused by a difference in distance while suppressing an increase in size.

In a vehicular lamp 10, a light-collecting optical path 43 extending from each condenser lens portion (31, 32, 33) to a corresponding slit section 28 is partitioned by a light-shielding plate 44 for each corresponding combination. Therefore, the vehicular lamp 10 can prevent the light passing through the respective condenser lens portions (31, 32, 33) from advancing to the corresponding slit portion 28, and can form the desired illumination patterns Di (illumination patterns Pi) more clearly.

A vehicular lamp 10 has a condenser lens 12 formed by integrating a plurality of condenser lens portions (31, 32, 33). Therefore, the vehicular lamp 10 can contribute to further miniaturization and can appropriately form each illumination pattern Di.

A vehicular lamp 10 sets a reference line (Lb) on which a plurality of illumination patterns (Di) are arranged in an illumination pattern (Pi), sets a slit reference line (Ls) (light-transmitting part reference line) corresponding to the reference line (Lb) in a light-shielding member (shade 13), and the direction in which a plurality of light sources (21, 22, 23) are arranged is inclined to the side on which the slit reference line (Ls) is inclined on the light-shielding member 13 with respect to a first direction (vertical direction) in which the condenser lens portions (31, 32, 33) are stacked. Therefore, when the vehicular lamp 10 is projected onto the road surface 2 by the projection lens 14, the vehicular lamp 10 can have a positional relationship aiming at each illumination pattern Di, and can form a desired illumination pattern Pi on the road surface 2.

Therefore, the vehicular lamp 10 of the first embodiment as the vehicular lamp according to the present disclosure can form an illumination pattern Pi of a desired light distribution while suppressing an increase in size.

Embodiment 2

Next, a vehicular lamp 10A according to a second embodiment of the present disclosure will be described with reference to FIGS. 14 to 17. The vehicular lamp 10A forms an illumination pattern PiA different from that of the vehicular lamp 10 of the first embodiment. Since the basic concept and configuration of the vehicular lamp 10A are the same as those of the vehicular lamp 10 of the first embodiment, parts having the same configuration are denoted by the same reference numerals, and detailed description thereof is omitted.

As shown in FIG. 14 etc., the vehicular lamp 10A of the second embodiment forms an illumination pattern PiA on the road surface 2 behind the vehicle 1. The illumination pattern PiA has three illumination patterns DiA arranged in the left-right direction of the vehicle 1 behind the vehicle 1, and the three illumination patterns DiA are arranged at substantially equal intervals in the direction away from the vehicle 1. Here, when each illumination pattern DiA is individually shown, the one farthest from the vehicle 1 is set as the first illumination pattern DiA1, and the second illumination pattern DiA2 and the third illumination pattern DiA3 are set as the second illumination pattern DiA2 and the third illumination pattern DiA3 in order from the first illumination pattern DiA1 toward the vehicle 1. Therefore, in the illumination pattern PiA, the first illumination pattern DiA1 becomes a distant illumination pattern, the third illumination pattern DiA3 becomes a near illumination pattern, and the second illumination pattern DiA2 between them becomes an intermediate illumination pattern.

Each illumination pattern DiA is a V-shaped symbol which is long in the traveling direction of the vehicle 1 and widely opened, and has the same size as each other. In the illumination pattern PiA, the direction in which the vertices of the V-shape of each illumination pattern DiA are arranged is defined as the arrow direction, and the side (first illumination pattern DiA1 side) indicating the arrow direction is defined as the front side. The illumination pattern PiA can be seen as an arrow pointing in the arrow direction from the vehicle 1 by arranging the three illumination patterns DiA. In this illumination pattern PiA, a reference line LbA is set. The reference line LbA extends in the arrow direction, i.e., in the left-right direction of the vehicle 1, and is positioned outside each illumination pattern DiA (on the side away from the vehicle 1 and on the lower side as viewed from the front in FIG. 14). That is, the outer end portion of each illumination pattern DiA is positioned on the reference line LbA.

Figure 15:
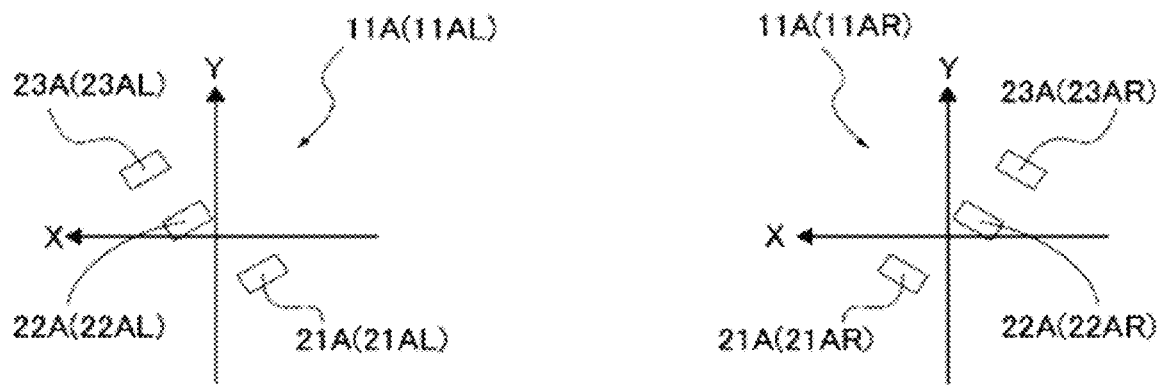
FIG. 15 is an explanatory diagram showing the arrangement of each light source in both vehicle lighting fixtures according to Example 2.

In order to form the illumination pattern PiA described above, part of the configuration of the light source portion 11A and the shade 13A of the vehicular lamp 10A is different from that of the vehicular lamp 10 of the first embodiment. In the light source unit 11A, each light source (21, 22, 23) emits amber light (amber light) with a Lambertian distribution centered on the emission optical axis. In the light source unit 11A, as shown in FIG. 15, the positional relationship between the first light source 21, the second light source 22, and the third light source 23 on the substrate 24 is different from that of the vehicular lamp 10. The third light source 23 of the second embodiment is positioned on the upper side of the projected optical axis Lp in the vertical direction and on the outer side of the projected optical axis Lp in the width direction (outer edge side of the vehicle 1 to be mounted). The second light source 22 of the second embodiment is positioned slightly above the projection optical axis Lp in the vertical direction and slightly outside the projection optical axis Lp in the width direction. The first light source 21 of the second embodiment is positioned below the projected optical axis Lp in the vertical direction and inside the projected optical axis Lp in the width direction (toward the center of the vehicle 1 to be mounted). For this reason, the three light sources (21, 22, 23) have a positional relationship in which the three light sources (21, 22, 23) are largely inclined inward from the third light source 23 toward the first light source 21 with respect to the vertical direction.

Figure 16:
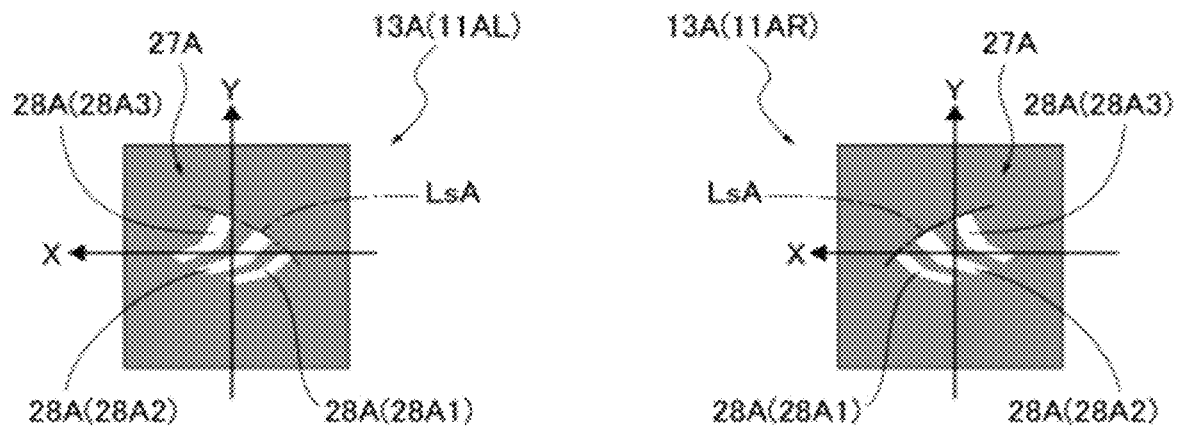
FIG. 16 is an explanatory diagram showing the individual slit portions of the shade in both vehicle lighting fixtures according to Example 2.

In the shade 13A, as shown in FIG. 16, three slit portions 28A (light-transmitting portions) corresponding one to-one to three illumination patterns DiA are provided. Since the projection lens 14 inverts the shade 13A (the illumination slit 27A) and projects it onto the road surface 2, each of the slit portions 28A has a positional relationship rotationally symmetric about the projection optical axis Lp with respect to the positional relationship of each illumination symbol DiA of the illumination pattern PiA (see FIGS. 14, 16, and 17). Therefore, in each of the slit portions 28A, the first slit portion 28A1 at the innermost side in the width direction (the center side of the mounted vehicle 1) becomes a far slit portion corresponding to the first illumination pattern DiA1 (far illumination pattern) of the illumination pattern PiA. Further, in each of the slit portions 28A, the second slit portion 28A2 on the outside thereof (on the outer edge side of the mounted vehicle 1) becomes an intermediate slit portion corresponding to the second illumination pattern DiA2 (intermediate illumination pattern). In each of the slit portions 28A, the outermost third slit portion 28A3 becomes a near slit portion corresponding to the third illumination pattern DiA3 (near illumination pattern).

The positions of the slit portions 28A on the shade portion 25 are set so that the respective illumination patterns DiA are aimed at the positional relationship on the road surface 2. In the shade 13A of the second embodiment, the illumination patterns DiA are arranged in parallel in a direction that is greatly inclined toward the inside in the width direction from the upper side to the lower side in the vertical direction. In the shade 13A, the center of the third slit portion 28A3 is positioned above the projected optical axis Lp in the vertical direction and outside the projected optical axis Lp in the width direction. In the shade 13A, the center of the second slit portion 28A2 is positioned below the projected optical axis Lp in the vertical direction and inside the projected optical axis Lp in the width direction. Further, in the shade 13A, the first slit portion 28A1 is positioned below the center of the second slit portion 28A2 in the vertical direction and inside the center of the second slit portion 28A2 in the width direction.

Each of the slit portions 28A is shaped to imitate a V-shaped symbol which opens wide similarly to each corresponding illumination pattern DiA, and the slit portions 28A are vertically and horizontally inverted with respect to each illumination pattern DiA. The sizes, shapes, and intervals of the three slit portions 28A are set in accordance with the distance to the road surface 2 and the angle between the road surface 2 and the projection optical axis Lp so that the respective illumination patterns DiA are equal in size and approximately equal intervals on the road surface 2. Specifically, in the vehicular lamp 10A, the distance from the shade 13A and the projection lens 14 to the road surface 2 is different because the projection optical axis Lp is provided to be inclined with respect to the road surface 2, so that when the vehicular lamp 10A is projected onto the road surface 2 by the projection lens 14, each slit portion 28A (each illumination pattern DiA which is light passing through the slit portion 28A) has a size and an interval corresponding to the distance.

Therefore, the size and interval of each slit portion 28A are set in accordance with the distance to the road surface 2 so that each illumination pattern DiA on the road surface 2 has the above-described size and approximately equal interval. Specifically, in the first embodiment, the first slit portion 28A1 is shaped to imitate a thin V-shaped symbol, the second slit portion 28A2 is shaped to imitate a larger V-shaped symbol than the first slit portion 28A1, and the third slit portion 28A3 is shaped to imitate a larger V-shaped symbol than the second slit portion 28A2. Further, in the illumination slit 27A, the slit reference line LsA on the shade 13A is curved, and each slit portion 28A is distorted with respect to each illumination pattern DiA so as to match the curvature of the slit reference line LsA.

The vehicular lamp 10A is assembled in the same manner as the vehicular lamp 10 of the first embodiment, and is provided at the rear portion of the vehicle 1 in a state in which the projection optical axis Lp is directed obliquely rearward of the outside of the vehicle 1 and is inclined with respect to the road surface 2 around the vehicle 1 (see FIG. 14). At this time, in the vehicular lamp 10A, although the slit reference line LsA is curved on the shade 13A, when the slit reference line LsA is projected onto the road surface 2, the corresponding reference line LbA becomes substantially straight and substantially parallel to the left-right direction of the vehicle 1. The vehicular lamp 10A rotates the housing 15 around the projected optical axis Lp in a state where the vehicular lamp 10A is provided at the rear portion of the vehicle 1. Then, in the illumination pattern PiA formed on the road surface 2, the vehicular lamp 10A can adjust the direction in which the degree of curvature of the reference line LbA in the illumination pattern PiA formed on the road surface 2. Therefore, in the vehicular lamp 10A, by appropriately setting the attitude of the housing 15 around the projection optical axis Lp, the direction in which the three illumination patterns DiA are arranged (arrow direction) and the reference line LbA can be made to coincide with the left-right direction of the vehicle 1. Thus, as shown in FIG. 14, the vehicular lamp 10A can form an illumination pattern PiA in which three illumination patterns DiA arranged in the left-right direction of the vehicle 1 are arranged on the road surface 2 behind the vehicle 1.

Figure 17:
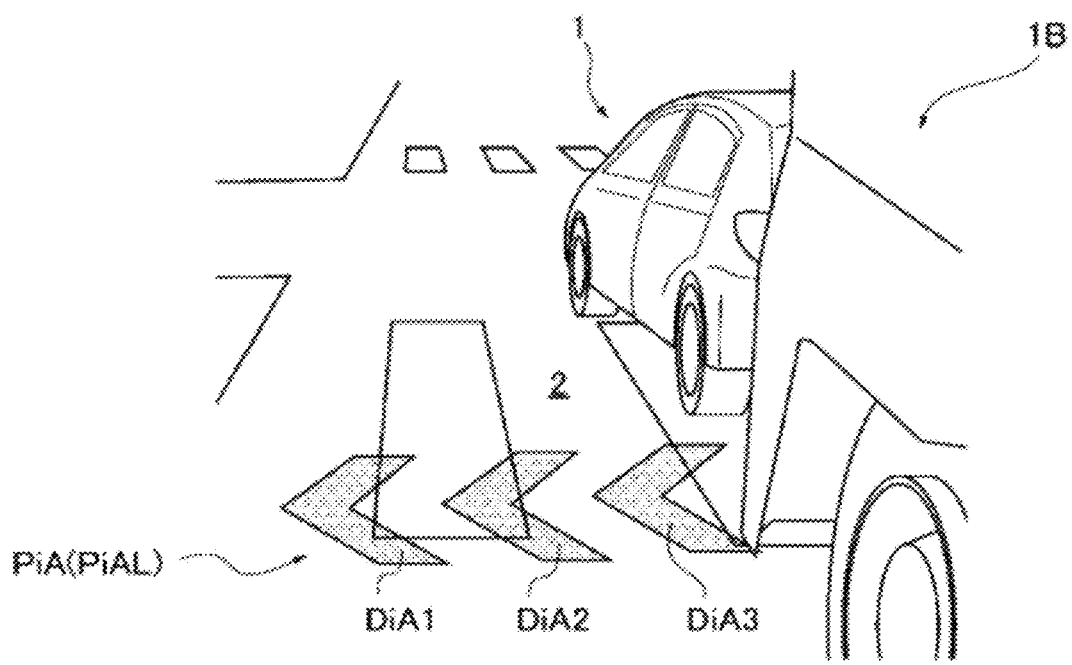
FIG. 17 is an explanatory diagram showing the appearance of the illumination patterns formed by the vehicle lighting fixture according to Example 2, installed on a vehicle and viewed from the surroundings.

The vehicular lamp 10A of the second embodiment is interlocked with a turn lamp, and when either the right or left turn lamp is turned on, each light source (21, 22, 23) provided on the lighted side of the turn lamp is turned on to form an illumination pattern PiA on the road surface 2. At this time, the illumination pattern PiA is illuminated in the order of the third illumination pattern DiA3, the second illumination pattern DiA2, and the first illumination pattern DiA1, similarly to the first embodiment. Therefore, as shown in FIG. 17, for example, in a scene where the vehicle 1 is going to turn left from a traveling alley, the vehicular lamp 10A can visually recognize the illumination pattern PiA formed on the road surface 2 even when it is difficult to see the turn lamp of the vehicle 1. Thus, even when a large vehicle (1) exists behind the vehicle (1) and the driver of a bicycle, motorcycle, or the like does not notice the blinking of the turn lamp of the vehicle (1), the illumination pattern (PiA) is largely formed in the forward direction on the road surface (2), so that the driver can instantly recognize that the vehicle (1) turns left. In addition, in the vehicle 1, when the hazard lamp is turned on, the two right and left vehicular lamps 10 simultaneously form the illumination pattern Pi on the road surface 2 (see FIG. 14), so that the vehicle 1 can recognize that the hazard lamp is turned on more reliably than when only the right and left turn lamps are turned on.

The vehicular lamp 10A of the second embodiment can obtain the following operational effects. Since the vehicular lamp 10A has basically the same configuration as that of the vehicular lamp 10 of the first embodiment, the same effect as that of the first embodiment can be obtained.

In addition, when the vehicular lamp 10A is mounted on the vehicle 1, the direction in which the plurality of illumination patterns DiA in the projected illumination pattern PiA are arranged can be adjusted by rotating the housing 15 around the projection optical axis Lp. Here, although the vehicular lamp 10A is provided at the rear portion of the vehicle 1, there is a limit in the position and size where the vehicular lamp 10A can be installed, so that the adjustment of the direction in which the respective illumination symbols DiA in the illumination pattern PiA are arranged (the direction in which the reference line LbA extends) may be limited, and the desired direction (the left-right direction of the vehicle 1 in the second embodiment) may not be possible. Since the vehicular lamp 10A has the above-described configuration, by rotating the housing 15 around the projection optical axis Lp, the direction in which the illumination patterns DiA are arranged can be adjusted to a desired direction. In other words, since the vehicular lamp 10A can set the size, shape, and the like of each slit portion 28A and the slit reference line LsA on the shade 13A in consideration of the rotation of the casing 15, these settings can be made easier than in the case where the rotation of the casing 15 is not considered.

Therefore, the vehicular lamp 10 of the second embodiment as the vehicular lamp according to the present disclosure can form an illumination pattern PiA having a desired light distribution while suppressing an increase in size.

Although the vehicular lamp of the present disclosure has been described based on each embodiment, the specific configuration is not limited to each embodiment, and changes and additions of designs are allowed as long as they do not depart from the gist of the invention according to each claim of the claims.

In each embodiment, the three illumination patterns Di having the above-described shapes are arranged in the above-described direction to constitute the illumination pattern Pi. However, as long as the illumination pattern is formed by a shade (light-shielding member), the patterns of the symbols as the illumination pattern Di, the positions to be formed, the number of the illumination patterns Di, and the like may be appropriately set, and the configuration is not limited to each embodiment. Further, although the vehicular lamp 10 is provided at the rear portion of the vehicle 1 in each embodiment, the vehicular lamp 10 may be housed in a door mirror, disposed in a lamp room of a front lamp or a lamp room of a taillight (lamp rooms on both right and left sides of the rear portion of the vehicle), or provided in a vehicle body as long as the vehicular lamp 10 is provided in the vehicle 1 according to a position at which an illumination pattern is formed with respect to the vehicle 1, and the configuration is not limited to each embodiment.

Further, in each of the embodiments, a shade 13 through which the light condensed by the condenser lens 12 passes through each slit portion 28 (28A) of the illumination slit 27 (27A) is used as a light shielding member. However, the light-shielding member may have another configuration as long as it is provided with a plurality of light-transmitting portions (slit portions) that partially pass the light condensed by the condenser lens, and is not limited to the configuration of each embodiment. As another configuration, for example, an illumination slit for partially transmitting light can be provided on a plate-shaped film member for preventing transmission of light, and a light shielding plate (filter) for transmitting light passing through a condenser lens through the illumination slit can be used.

Further, in each embodiment, the vehicular lamp 10, 10A is provided on the vehicle 1 driven by the driver. However, the vehicular lamp may be provided in a vehicle having an automatic operation function, and is not limited to the configuration of each embodiment. In this case, the vehicular lamp may form the illumination pattern at a timing corresponding to the intended use of the vehicle, that is, at a timing corresponding to some intention relating to the operation of the vehicle 1, and the configuration of each embodiment is not limited thereto.

In each embodiment, on the exit face 35 of the condenser lens 12, a step is provided between the inner exit surface section 41 and the outer exit surface section 42. However, the vehicular lamp is not limited to the configuration of each embodiment because it is not necessary to provide a step between the inner side emission surface portion 41 and the outer side emission surface portion 42 on the emission surface 35 and it is also possible to provide uniform optical characteristics. Here, in the condenser lens, if a step is not provided between the inner emission surface section and the outer emission surface portion, the light near the boundary between the inner emission surface section and the outer emission surface portion can be prevented from being refracted or reflected by the step and traveling in an unintended direction, so that the light can be used more efficiently.

In each embodiment, the shade 13 is provided with three slit portions 28 (28A), and the condenser lens 12 is provided with three condenser lens portions (31, 32, 33) and three light sources (21, 22, 23) individually corresponding to the slit portions 28 (28A). However, the number of light-transmitting portions (slit portions) may be appropriately set so long as the condenser lens is provided with a plurality of condenser lens portions and a plurality of light sources individually corresponding to the light-transmitting portions, and the condenser lens is provided with a plurality of condenser lens portions and a plurality of light sources, and the present invention is not limited to the configuration of each embodiment.

In each embodiment, in the condenser lens 12, the ratio of the size in the vertical direction is 5:4:3 for the first condenser lens portion 31: the second condenser lens portion 32: the third condenser lens portion 33. However, as long as the size of the condenser lens in the first direction (vertical direction) becomes larger as the condenser lens portion corresponding to the light source which is turned on in a later order, the ratio may be appropriately set, and the configuration of the condenser lens is not limited to each embodiment.

In each embodiment, the light-condensing optical path 43 is partitioned by each light-shielding plate 44 for each combination of the corresponding slit portion 28 (light-transmitting portion) from each condenser lens portion (31, 32, 33). However, when the light that has passed through each condenser lens portion does not advance to the corresponding slit portion (light-transmitting portion), it is not necessary to provide the light guide plate, and the configuration of each embodiment is not limited thereto.

DESCRIPTION OF REFERENCE NUMERALS 10, 10A Vehicular lamp
12 Condenser lens
13, 13A (as an example of a light shielding member) Shade
14 Projecting lens
15 Housing
21 First light source
22 Second light source
23 Third light source
28 (as an example of a light-transmitting portion) Slit
31 First condenser lens
32 Second condenser lens
33 Third condenser lens
34 Incident surface
35 Exit surface
36 On-axis incident surface
37 Inclined incident surface
38 Reflection surface
41 Inner exit surface
42 Outer exit surface
43 Condensing optical path
44 Light shielding plate
Di, DiA Illumination pattern
Lb reference line
Pi illumination pattern.

The invention claimed is:

1. A vehicular lamp comprising:
a plurality of light sources;
a condenser lens configured to let light from the plurality of light sources enter through an incident surface and exit through an exit surface to condense the light;
a light-shielding member provided with a plurality of light-transmitting portions through which light condensed by the condenser lens partially passes;
a projection lens for forming an illumination pattern having a plurality of illumination patterns corresponding to the plurality of light-transmitting portions by projecting light passing through the light-shielding member;
wherein
the light source is provided individually corresponding to the light-transmitting portion, and
the condenser lens includes a plurality of condenser lens portions which individually corresponding to the light-transmitting portion and are stacked.

2. The vehicular lamp according to claim 1 wherein
the plurality of condenser lens portion includes an on-axis incident surface section in which the incident surface is provided on an outgoing optical axis of the corresponding light source and a plurality of inclined incident surface section which are inclined with respect to the on-axis incident surface section,
and the plurality of condenser lens portion includes a refection surface corresponding to each of the inclined incident surface section.

3. The vehicular lamp according to claim 2 wherein
the plurality of condenser lens portion includes an inner exit surface section in which the exit surface is provided on the outgoing optical axis and corresponds to the on-axis incident surface and a pair of outer exit surface sections sandwiching the inner exit surface section and corresponding to the reflection surface,
the inner exit surface section spreads light passing through the on-axis incident surface section over the corresponding light-transmitting portion,
the outer exit surface section condenses light from the refection surface toward a target position in the light-transmitting portion.

4. The vehicular lamp according to claim 1 wherein,
if a direction in which the condenser lens portions are stacked is defined as a first direction, the plurality of the light sources are sequentially lighted and the size of the condenser lens portion in the first direction is larger than the size of the condenser lens portion corresponding to the light source which is lighted later in order.

5. The vehicular lamp according to claim 1 wherein a light-condensing optical path is defined by a path extending from a plurality of the condenser lens portions to the corresponding light-transmitting portion, and the light-condensing optical path is partitioned by a light-shielding plate for each combination of the corresponding condenser lens portion and the corresponding light-transmitting portion.

6. The vehicular lamp according to claim 1, wherein the condenser lens is formed integrally with the plurality of condenser lens portions.

7. The vehicular lamp according to claim 1, wherein a reference line on which a plurality of the illumination patterns are arranged is set in the illumination pattern, a light-transmitting portion reference line corresponding to the reference line is set in the light-shielding member, and if a direction in which the condenser lens portions are stacked is defined as a first direction, a direction in which the plurality of light sources are arranged is inclined relative to the first direction toward a side on which the light-transmitting portion reference line is inclined on the light-shielding member.

8. The vehicular lamp according to claim 1, wherein the plurality of light sources, the condenser lens, the light shielding member and the projection lens are fixed to a housing, and when the housing is mounted on a vehicle, the housing is rotated around a projection optical axis so that the direction in which a plurality of the illumination designs in the projected illumination pattern are arranged can be adjusted.

* * * * *